United States Patent
Mitra et al.

(10) Patent No.: US 11,115,204 B2
(45) Date of Patent: Sep. 7, 2021

(54) COOPERATIVE PLATFORM FOR GENERATING, SECURING, AND VERIFYING DEVICE GRAPHS AND CONTRIBUTIONS TO DEVICE GRAPHS

(71) Applicant: ADOBE INC., San Jose, CA (US)

(72) Inventors: Subrata Mitra, Bangalore (IN); Vishal Babu Bhavani, Mumbai (IN); Sunav Choudhary, Bengaluru (IN); Kishalay Raj, New Delhi (IN); Ayush Chauhan, Meerut (IN)

(73) Assignee: Adobe Inc., San Jose, CA (US)

( * ) Notice: Subject to any disclaimer, the term of this patent is extended or adjusted under 35 U.S.C. 154(b) by 605 days.

(21) Appl. No.: 15/845,948

(22) Filed: Dec. 18, 2017

(65) Prior Publication Data

US 2019/0190701 A1    Jun. 20, 2019

(51) Int. Cl.
| | |
|---|---|
| *H04L 9/32* | (2006.01) |
| *H04L 9/08* | (2006.01) |
| *G06N 7/00* | (2006.01) |
| *G06N 5/02* | (2006.01) |

(52) U.S. Cl.
CPC ............. *H04L 9/088* (2013.01); *G06N 5/022* (2013.01); *G06N 7/005* (2013.01)

(58) Field of Classification Search
CPC ... H04L 9/088; H04L 2209/38; H04L 9/3239; G06N 7/005; G06N 5/022
See application file for complete search history.

(56) References Cited

U.S. PATENT DOCUMENTS

| 10,534,919 | B1* | 1/2020 | Panchbudhe | G06Q 10/06 |
| 2008/0141027 | A1* | 6/2008 | Kim | H04L 9/3218 |
| | | | | 713/156 |
| 2017/0161761 | A1 | 6/2017 | Koh et al. | |
| 2018/0069849 | A1* | 3/2018 | Kraemer | H04L 9/3218 |
| 2018/0196694 | A1* | 7/2018 | Banerjee | G06F 9/466 |

(Continued)

OTHER PUBLICATIONS

Adobe. (May 2017). Adobe Marking Cloud Device Co-op Documentation. Retrieved from the Internet Dec. 18, 2017 at <https://marketing.adobe.com/resources/help/en_US/mcdc/mcdc-overview.html>. (30 pages).

(Continued)

*Primary Examiner* — Amie C. Lin

(57) ABSTRACT

Graphing services are provided to a device cooperative that includes data contributors, e.g., website hosts. Anonymized user data, provided by the data contributors, is accessed, via a blockchain, decrypted, and aggregated. A device graph is generated based on the aggregated user data. Contribution metrics are provided to the data contributors. A first contribution metric for a first data contributor indicates a contribution to the device graph of a first portion of the user data that was provided by the first data contributor. In response to receiving a request for a verification of the first contribution metric, a zero knowledge proof of the first contribution metric is generated and provided to the first data contributor. The first data contributor is enabled to evaluate the zero knowledge proof independent of access to a second portion of the user data that was provided by a second data contributor of the device cooperative.

6 Claims, 13 Drawing Sheets

(56) References Cited

U.S. PATENT DOCUMENTS

| | | | |
|---|---|---|---|
| 2018/0316704 A1* | 11/2018 | Joseph Durairaj | ........................ |
| | | | H04L 63/1425 |
| 2020/0119925 A1* | 4/2020 | Wang | ................... H04L 9/0637 |

OTHER PUBLICATIONS

Ben-Sasson, E., Chiesa, A., Genkin, D., Tromer, E., & Virza, M. (2013). SNARKs for C: Verifying program executions succinctly and in zero knowledge. In Advances in Cryptology—CRYPTO 2013 (pp. 90-108). Springer, Berlin, Heidelberg.

Ben-Sasson, E., Chiesa, A., Tromer, E., & Virza, M. (Aug. 2014). Succinct Non-Interactive Zero Knowledge for a von Neumann Architecture. In USENIX Security Symposium (pp. 781-796).

Ben-Sasson, E., Chiesa, A., Garman, C., Green, M., Miers, I., Tromer, E., & Virza, M. (May 2014). Zerocash: Decentralized anonymous payments from bitcoin. In Security and Privacy (SP), 2014 IEEE Symposium on (pp. 459-474). IEEE.

Croman, K., Decker, C., Eyal, I., Gencer, A. E., Juels, A., Kosba, A., . . . & Song, D. (Feb. 2016). On scaling decentralized blockchains. In International Conference on Financial Cryptography and Data Security (pp. 106-125). Springer Berlin Heidelberg.

Demellweek, D. (Jun. 2017). Blockchain-based Zero Knowledge Proof solution. LinkedIn Pulse. 5 pages. Retrieved from the internet Sep. 17, 2017 at <https://www.linkedin.com/pulse/blockchain-based-zero-knowledge-proof-solution-dean-demellweek-mfa>.

Eyal, I., Gencer, A. E., Sirer, E. G., & Van Renesse, R. (Mar. 2016). Bitcoin-NG: A Scalable Blockchain Protocol. In NSDI (pp. 45-59).

Greenspan, G., (Nov. 2016). Understanding zero knowledge blockchains. MultiChain Blog. 5 pages. Retrieved from the internet Sep. 28, 2017 at <https://web.archive.org/web/20170928111508/https://www.multichain.com/blog/2016/11/understanding-zero-knowledge-blockchains/>.

GSMA. (Feb. 2015) GSMA: The Impact of the Internet of Things. [White Paper]. Retrieved from the Internet Aug. 31, 2017 from <https://www.gsma.com/newsroom/wp-content/uploads/15625-Connected-Living-Report.pdf>.

Miers, I., Garman, C., Green, M., & Rubin, A. D. (May 2013). Zerocoin: Anonymous distributed e-cash from bitcoin. In Security and Privacy (SP), 2013 IEEE Symposium on (pp. 397-411). IEEE.

Nakamoto, S. (2008). Bitcoin: A peer-to-peer electronic cash system. 28 pages.

Samman, G. (Sep. 2016). The Trend Towards Blockchain Privacy: Zero Knowledge Proofs. Sammantics Blog. 15 pages. Retrieved from the internet Sep. 28, 2017 at <https://web.archive.org/web/20170928131655/http://sammantics.com/blog/2016/8/23/the-trend-towards-privacy-how-blockchains-plan-to-accomplish-this>.

Swan, M. (2015). Blockchain: Blueprint for a new economy (149 pages). ISBN: 978-1-491-92049-7. O'Reilly Media, Inc.

Goldwasser, S., Micali, S., & Rackoff, C. (1989). The knowledge complexity of interactive proof systems. SIAM Journal on computing, 18(1), 186-208.

* cited by examiner

```
DEFINITION CalculateRelativeContribution(Px, Pt):

data_from_x = getData(Px)
    whole_data = getData(Pt)

contribution_from_x =
CalculateContributionFromData(data_from_x)
    total_contribution =
CalculateContributionFromData(whole_data)

relative_contribution_of_x = contribution_from_x /
total_contribution

RETURN relative_contribution_of_x
```

---

```
DEFINITION CalculateContributionFromData(data):

contribution = use_known_formula(data)

RETURN contribution

DEFINITION getData (set of pointers P):

K <= Set of decryption keys present with Adobe

For pointer p in P:
        data = data + Decrypt ( BlockChain [p] , K)

RETURN data
```

FIG. 7C

COOPERATIVE PLATFORM FOR GENERATING, SECURING, AND VERIFYING DEVICE GRAPHS AND CONTRIBUTIONS TO DEVICE GRAPHS

BACKGROUND

Users typically employ more than one computing device to interact with websites, such as Facebook, Amazon, or Macy's. When interacting with such websites, both the host of the website (i.e., the host) and a user of the website (i.e., the user) may benefit from the automatic identification of the user. Device graphs provide a mapping of a user to their multiple devices, such that a user may be identified based on an identification of the device that the user employs to interact with a website. Any single host, especially hosts of websites with low traffic volumes, may not have access to enough data connecting users to their devices (i.e., user data) to generate a robust mapping. However, by leveraging user data generated by multiple websites, a more robust device graph that spans many users and many devices may be generated. To pool their user data and generate such robust device graphs, hosts of websites have cooperated in the formation of device cooperatives.

In conventional device cooperatives, each host provides their user data directly to a coordinating party. The coordinating party aggregates the user data and generates a device graph based on the aggregated user data. The coordinating party may provide each participating host a copy of the device graph. Several technical problems exist in such conventional device cooperatives. Firstly, the participating hosts must place a high degree of trust in the coordinating party. For instance, a host has no guarantee that the coordinating party will not tamper with or misuse their user data.

Secondly, a host may lack clarity into the benefit they receive from participating in the conventional device cooperative, i.e., a host lacks visibility into their overall contribution to the device graph. This is especially concerning for hosts of more trafficked websites that may contribute a significant amount of user data, while hosts of less popular websites contribute very little user data. Even if a host's contribution to the device graph is quantified, the host may have no ability to audit the determination of their contribution quantification without access to the user data provided by the other data contributors. Typically, a host will not join a device cooperative without a guarantee that their user data will not be exposed to other hosts. Additionally in conventional device cooperatives, a host may experience difficulty when leaving the device cooperative. For example, once a host leaves a conventional device cooperative, the host may be unable to prevent the misuse or exposure of their user data to other parties.

Accordingly, for the widespread adoption of device cooperatives, what is needed is a mechanism that enables hosts to share their user data, but prevents other parties, such as the coordinating party, from tampering with or misusing their user data. Also needed is a mechanism that quantifies a host's contribution to the device graph and enables a verifiable audit of the quantification without exposing a host's user data to other hosts within the device cooperative. Additionally needed is a mechanism that enables a host to leave a device cooperative with a guarantee that their user data will no longer contribute to the device graph, and will not be misused or exposed to hosts.

SUMMARY

Aspects of the present invention are directed towards enhanced systems and methods for providing device graphing services to a device cooperative that include data contributors, which are operators or hosts of websites, such as but not limited to Facebook, Amazon, and Macy's. Data contributor's share anonymized versions of their user data. Some aspects are directed to employing a blockchain-type ledger in the process of generating a device graph. The device graph maps devices to individual (and anonymized) users. Periodically, each data contributor provides their encrypted user data. A data contributor's user data associates device IDs with anonymized user IDs. Each time encrypted user data is provided by a data contributor, the encrypted user data is placed in the blockchain as a new block or transaction. Each data contributor also shares decryption keys with an aggregator. The aggregator is a trusted or privileged host included in the cooperative who is responsible for generating the device graph. The decryption keys are used by the aggregator to extract and decrypt the user data from each block of the blockchain. The device graph is then built from the decrypted user data. The device graph may be built from the decrypted user data, for instance, using existing algorithms for building device graphs. The device graph maps user IDs to device IDs via graph edges. Each graph edge includes a list of pointers to blocks in the blockchain to track what part of the user data (i.e., which block from the blockchain) contributed to building each part of the device graph.

Further aspects of the invention are directed to using a zero knowledge proof to verify a data contributor's contribution to the device graph without granting the data contributor access to the user data provided by other data contributors. A contribution metric is first determined for each data contributor that represents each data contributor's relative contribution to the device graph. The contribution metric for a data contributor is determined by using the pointers in the device graph to identify blocks in the blockchain corresponding to each edge in the device graph and determine the contribution of the data contributor to the edges based on the corresponding blocks.

The determination of the contribution metric is then verified using zero knowledge proof, which may be accomplished using the zk-SNARK algorithm. This verification process includes the aggregator providing, to a data contributor, the source code that was used to determine the data contributor's contribution metric. Also prior to the verification process, the aggregator and the data contributor agree upon an encryption function. The data contributor generates a pair of keys (a prover key and a verifier key) using an encryption function. The data contributor provides only the prover key to the aggregator. The aggregator compiles the source code into a quadratic equation of polynomials, wherein the equation holds if and only if the data contributor's contribution metric was calculated correctly. The aggregator may "prove" to the data contributor that their contribution metric was calculated correctly by proving that the quadratic equation of polynomials is true across the domain of the equation, without providing the values of the polynomials at any point in the domain of the equation.

The data contributor selects a (secret) point in the domain of the polynomial equation. The point should be kept secret from the aggregator, such that the aggregator does not know which points that the equality of the polynomials will be evaluated. To keep the point unknown to the aggregator, the data contributor generates an encrypted value of the secret point based on the agreed upon encryption function, the source code, and the verifier key. The data contributor provides the encrypted value of the secret point to the aggregator. The prover key enables the aggregator to compute an encrypted value of each of the polynomials in the polynomial equation evaluated at the secret point, but does not expose the secret point to the aggregator. The aggregator obfuscates the encrypted values of the polynomials by multiplying each with a secret constant scalar and provides the obfuscated values to the data contributor. The data contributor may verify that their contribution metric was determined correctly by verifying the product of obfuscated encrypted values of the polynomials satisfy the polynomial equation. Because the contribution of the secret scalar is canceled out in the product of the polynomial values, the data contributor need not have knowledge of the secret scalar value.

BRIEF DESCRIPTION OF THE DRAWINGS

FIG. 7C illustrates pseudocode implementing one embodiment for determining a contribution metric for an data contributor of a device cooperative that is consistent with the various embodiments presented herein.

DETAILED DESCRIPTION

Figure 1:
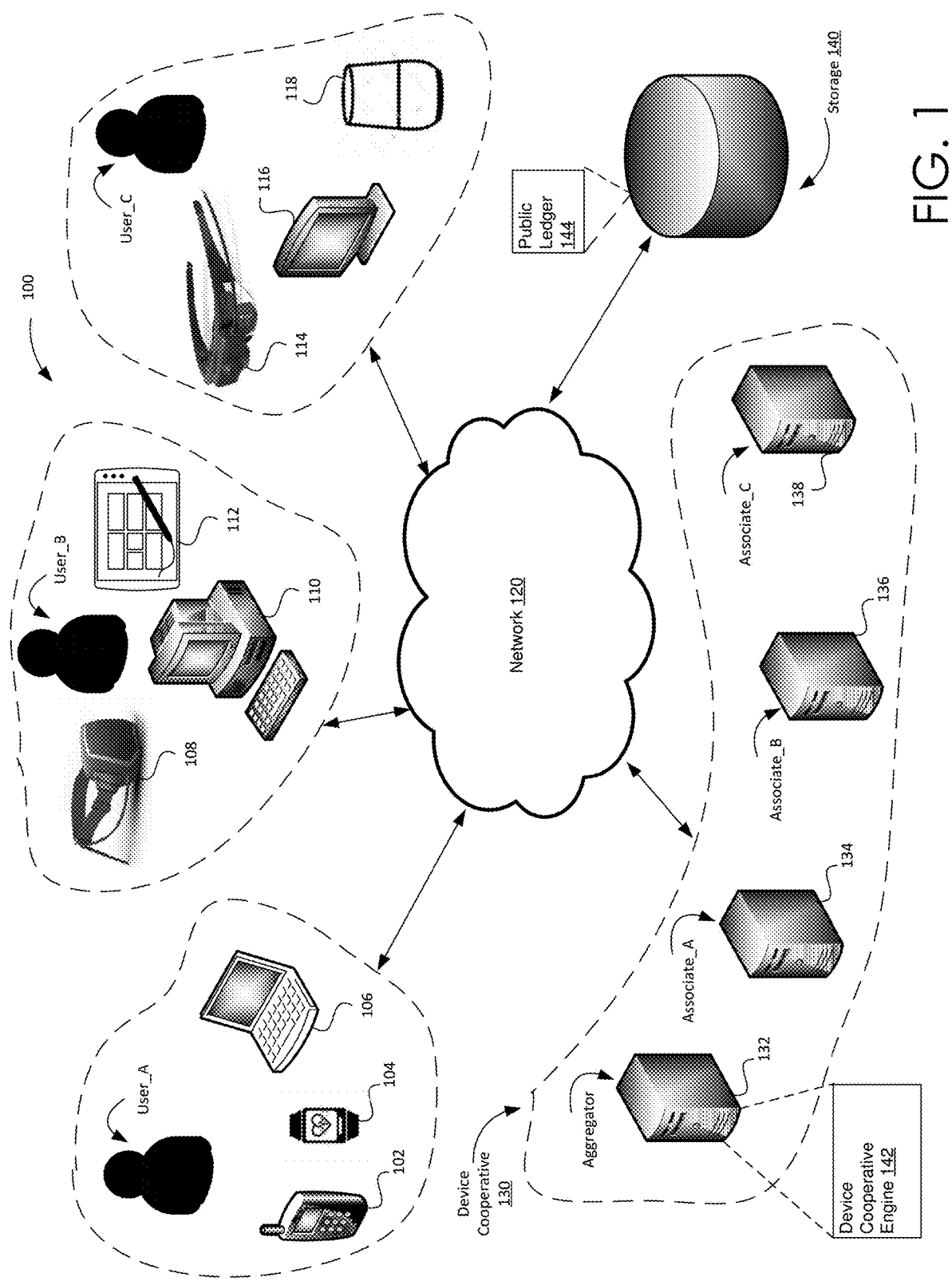
FIG. 1 illustrates an exemplary operating environment 100 implementing various embodiments presented herein.

As used herein, the term "host" refers to an entity that hosts or provides a website, such as but not limited to Facebook, Amazon, or Macy's. Herein, a website may be referred to as an "online platform," or simply a "platform."

As used herein, the term "user" refers to a user of a website. As used herein, the terms "device graph" and "graph" may be used interchangeably to refer to a graph that includes a hierarchy that maps devices and connects them to individual users, via graph edges. As discussed below, because users may be anonymized, a device graph need not identify a specific user. Rather, a device graph may identify an anonymized user. In at least one embodiment, a device graph identifies a set of devices that are employed by the same user and/or household.

As used herein, the terms "device cooperative" or "cooperative" refers to a set, collection, or group of hosts that cooperate to provide, aggregate, and employ user data for the purpose of generating a device graph. The device cooperative may include a privileged or trusted host, herein referred to as the "data aggregator," or simply the "aggregator" of the device cooperative. The other (non-privileged and/or non-trusts) hosts of a cooperative are herein referred to as "data contributors," or simply "contributor." Essentially, data contributors contribute and/or provide their user data to a device cooperative and the aggregator aggregates the user data and generates the device graph based on data contributors' user data.

As used herein, the term "user data" includes any data that a data contributor may generate, observe, collect, determine, and/or infer from the online activities of their users, which may be employed to determine an association, correspondence, or correlation between one of their users and a unique device. That is, user data is any data that enables an association between device IDs and user IDs. A data contributor may cull or collect their user data from their user activity logs. For instance, user data may include user-logon events, such as the log data generated when a user is authenticated via the data contributor's website. In various embodiments, user data may include, but is not limited to user credentials, user identification (IDs), internet-protocol (IP) addresses, media access control (MAC) addresses, or the like. When providing their user data, a data contributor may provide virtually any data gathered from their online platform that may be directly or indirectly employed to determine a correspondence, association, or correlation between a user and a computing device employed to access and/or browse their online platform. Such a correspondence between a user and a device, as reflected within a device graph may be a deterministic correspondence (i.e., the probability of the correspondence is substantially close to unity) or a probabilistic correspondence (i.e., the probability of the correspondence is less than unity).

For example, the data contributor's user data may include the data contributor's event log data, such as but not limited to data encoding and/or indicating which user devices and/or IP addresses were employed to access user accounts associated with a particular user ID and/or anonymously browse the data contributor's platform. The user data may include deterministic data that is employed to deterministically associate a user with a particular device to a high degree of likelihood that approaches certainty, i.e., the correspondence and/or connection between a user and a device in the device graph is deterministic. The user data may additionally include probabilistic data that is employed to probabilistically associate a user with a particular device with less certainty, i.e., a connection probability that is less than 1.0. Accordingly, a device graph may include deterministic and probabilistic edges reflecting the likelihood of a connection between a user and a device.

As used herein, the term "contribution metric" of or for a data contributor may refers to a numerical relative or absolute quantification and/or measurement of their contribution to the overall device graph based on the user data provided by the data contributor.

As used herein, the terms "blockchained ledger," "blockchain-type ledger," or simply "blockchain" may refer to any set of linked transactions. Each transaction within a blockchain-type ledger includes a hashed value of the previous transaction, rendering the ledger essentially tamper-proof. That is, upon the insertion of a subsequent transaction, any editing to a transaction may be detectable to any party that has access to view the ledger and access to the hash function employed to generate the hash value of the transaction via a traversal of the ledger. More particularly, when such a ledger is a "distributed" or "public ledger," i.e., each transaction is distributed to a plurality of parties, no single party or combination of parties may edit the transactions without detection by the other parties.

As addressed above, what is needed is a mechanism that enables data contributors to share their user data, but prevents the data aggregator from tampering with or misusing their user data. Also needed is a mechanism that quantifies a data contributor's contribution to the device graph and enables a verifiable audit of the quantification without exposing the data contributor's user data to other parties. Additionally needed is a mechanism that enables a data contributor to leave a device cooperative with a verifiable guarantee that their user data will no longer contribute to the device graph, and will not be misused or exposed to other parties.

Briefly stated, various embodiments are directed towards providing these needed mechanisms. Some aspects of the present invention are directed to employing a blockchain in the process of generating a device graph that maps devices to individual users. Periodically, each data contributor provides encrypted user data that associates device IDs with user IDs. Each time encrypted user data is provided by a data contributor, the encrypted user data is placed in the blockchain as a new block.

Each data contributor also shares decryption keys with the data aggregator who is responsible for generating the device graph. The decryption keys are used by the data aggregator to extract and decrypt the user data from each block of the blockchain. The device graph is then built from the decrypted user data. The device graph may be built from the decrypted user data, for instance, using existing algorithms for building device graphs. The device graph maps user IDs to device IDs via graph edges. Each graph edge includes a list of pointers to blocks in the blockchain to track what part of the user data (i.e., which block from the blockchain) contributed to building each part of the device graph.

The use of the blockchain in this invention prevents the data aggregator, as well as data contributors, from tampering with or altering user data once it is entered into the blockchain. The encryption of the user data within the blockchain prevents the exposure of a data contributor's user data to other data contributors. Accordingly, blockchaining a mechanism that enables data contributors to share their user data, but prevents the data aggregator from tampering with or misusing their user data. Even though each data contributor may read and/or write to the blockchain, because the data written to the blockchain is encrypted, only the trusted aggregator has access to each data contributor's tamperproof user data.

Further aspects of the invention are directed determining a contribution metric for each data contributor and employing a zero knowledge proof to verify and/or audit the determination of a data contributor's contribution metric. The contribution metric quantifies the data contributor's relative contribution to the device graph. The employment of the zero knowledge proof enables the verification of the data contributor's contribution to the device graph without granting the data contributor access to the user data of other data contributors. Accordingly, the zero knowledge proof provides a mechanism enables a verifiable audit of the determination of the contribution metric exposing the data contributor's user data to other data contributors. As discussed below, the zero knowledge proof provides a mechanism that enables a data contributor to leave a device cooperative with a verifiable guarantee that their user data will no longer contribute to the device graph, and will not be misused or exposed to other parties.

A contribution metric is first determined for each data contributor that represents each data contributor's relative contribution to the device graph. The contribution metric for a data contributor is determined by using the pointers in the device graph to identify blocks in the blockchain corresponding to each edge in the device graph and determine the contribution of the data contributor to the edges based on the corresponding blocks. The determination of the contribution metric is then verified using a zero knowledge proof. This verification process includes the aggregator providing, to the data contributor, source code that was used to determine the data contributor's contribution metric. The data contributor generates a pair of keys (a prover key and a verifier key) using an encryption function agreed upon by the aggregator and the data contributor. The data contributor provides the prover key to the aggregator, which uses the prover key and the source code to generate a zero knowledge proof of the computation of the contribution metric. The zero knowledge proof may be, for instance, a probabilistically-checkable-proof (PCP) generated using the existing zk-SNARK algorithm. The data contributor uses the verifier key to cryptographically process the PCP, and the data contributor can verify the data contributor's contribution metric based on a comparison of the data contributor's contribution metric and the cryptographically processed PCP.

Figure 2:
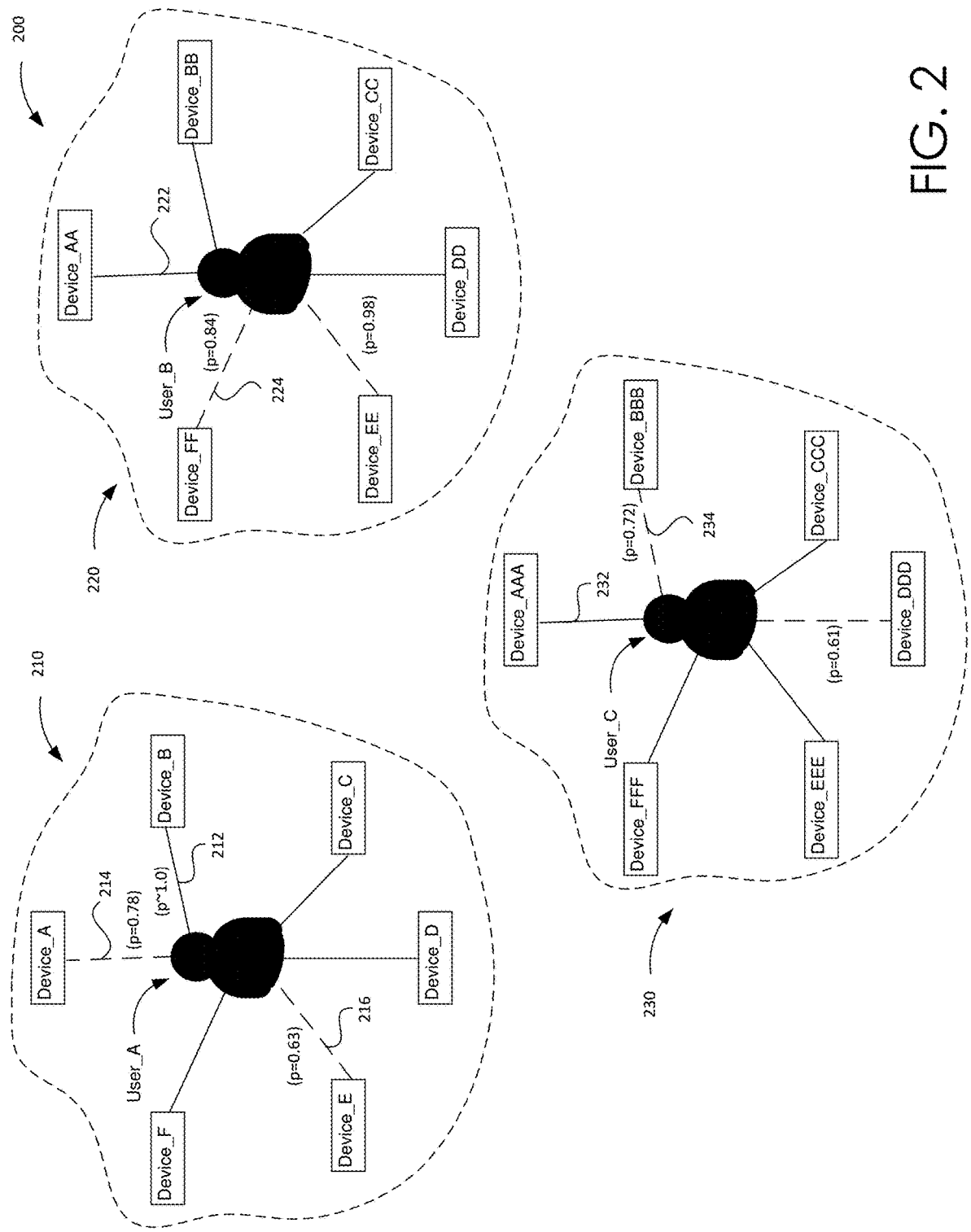
FIG. 2 illustrates one non-limiting embodiment of a device graph.

As noted above, a device graph is a graph that maps or connects users to their devices via graph edges. A non-limiting exemplary embodiment of a device graph is illustrated in FIG. 2. The data contributor's user data may be culled from their user activity logs. For instance, user data may include user-logon events, such as the log data generated when a user is authenticated via the data contributor's online platform. User data may include, but is not limited to user credentials, user identification (IDs), internet-protocol (IP) addresses, media access control (MAC) addresses, or the like. For user data, a data contributor may provide virtually any data gathered from their online platform that may be directly or indirectly employed to determine a correspondence, association, or correlation between a user and a computing device employed to access and/or browse their online platform. Such a correspondence between a user and a device, as reflected within a device graph may be a deterministic correspondence (i.e., the probability of the correspondence is substantially close to unity) or a probabilistic correspondence (i.e., the probability of the correspondence is less than unity).

For example, the data contributor's user data may include the data contributor's event log data, such as but not limited to data encoding and/or indicating which user devices and/or IP addresses were employed to access user accounts associated with a particular user ID and/or anonymously browse the data contributor's platform. The user data may include deterministic data that is employed to deterministically associate a user with a particular device to a high degree of likelihood that approaches certainty, i.e., the correspondence and/or connection between a user and a device in the device graph is deterministic. The user data may additionally include probabilistic data that is employed to probabilistically associate a user with a particular device with less certainty, i.e., a connection probability that is less than 1.0. Accordingly, a device graph may include deterministic and probabilistic edges reflecting the likelihood of a connection between a user and a device.

A data contributor may anonymize their user data provided to the device cooperative, such that a user's identity as a real-life person is not determinable, or at least very difficult to determine, based on the user data. Furthermore, prior to providing their user data to the device cooperative, a data contributor may cryptographically safeguard their user data. That is, a data contributor may encrypt their user data to any cryptographically secure level that is appropriate to their and their user' security concerns. Because the user data that a data contributor contributes to the cooperative may be encrypted, and the data contributor need not share their cryptographic keys with other data contributors, the data contributor is assured that other data contributors, including data contributors that are their competitors, cannot access their user data. Furthermore, because the user data is anonymized, the data contributor and their users, privacy concerns surrounding cooperative and/or crowdsourced efforts are attenuated.

To provide their contribution to the device cooperative, each data contributor periodically updates the cooperative's ledger to include a new transaction populated with their user data acquired since their last entry into the ledger. The ledger may be a distributed and/or public ledger, such as but not limited to a blockchain-type ledger. An exemplary, but non-limiting embodiment of a blockchain-type public ledger is discussed below in conjunction with FIG. 4A. However, briefly here, each transaction within a blockchain-type ledger includes a hashed value of the previous transaction, rendering the ledger essentially tamper-proof. That is, upon the insertion of a subsequent transaction, any editing to a transaction may be detectable to any party that has access to view the ledger and access to the hash function employed to generate the hash value of the transaction via a traversal of the ledger. More particularly, when such a ledger is a distributed or public ledger, i.e., each transaction is distributed to a plurality of parties, no single party or combination of parties may edit the transactions without detection by the other parties. As discussed below, in such blockchain-type embodiments, a data contributor (or any other party) cannot alter or falsify data employed to generate their contribution metric or the contribution metric of another data contributor.

Although various public ledger embodiments are discussed throughout, in at least some embodiments, a distributed and/or public ledger may be secured such that only hosts included in the cooperative are enabled to view and/or write to the ledger. As discussed throughout, even if parties outside of the cooperative are enabled to access the ledger, the cooperative's security and privacy risk would not be compromised. For instance, because a data contributor's user data is encrypted, parties without a data contributor's encryption keys may not access the data contributor's user data. Any data written to the ledger by a party outside the cooperative may easily be disregarded or vetoed during the generation and/or updating of a device graph. In addition, because the ledger may be a blockchain-type ledger, a data contributor's user data may not be tampered with and/or edited by either data contributors of the cooperative or parties external to the cooperative.

Because of the aggregator's privileged status, the aggregator may be a "trusted" host of the cooperative. Thus, each data contributor may provide the aggregator one or more cryptographic keys that enables decrypting the data contributor's user data within the ledger so that the aggregator may aggregate the user data from all the data contributors. That is, the aggregator is enabled to decrypt and aggregate each of the data contributors' user data. The aggregator may deterministically and probabilistically analyze the decrypted and aggregated user data to generate and/or update the device graph. That is, the aggregator may generate and/or update deterministic and probabilistic graph edges connecting and/or mapping anonymized users to devices.

The aggregator may provide each data contributor with a copy of the device graph. If a data contributor's user data contributed to at least one graph edge connected to a particular anonymized user, the data contributor may have user data that enables the de-anonymization of the a particular user. For example, the data contributor may determine a correspondence between the real-life identity (or at least an online identity) of the user and one or more devices employed by the user via the crowdsourced device graph. Otherwise, a user included in the device graph remains as an anonymized user to the other data contributors in the cooperative. Thus, the privacy of the data contributors' platform users remains secured.

For each edge in the device graph, the aggregator may generate one or more references, links, and/or pointers to the particular transactions in the ledger that contributed to the determination of the edge. An attribution data structure may encode a list of references, links, and/or pointers to ledger transactions that contributed to each graph edge of the device graph. A non-limiting exemplary embodiment of such an attribution data structure is discussed below in conjunction with FIG. 4B.

Such references, links, and/or points from edges to the contributing data contributor's transactions enable the determination of a contribution metric for each data contributor. A data contributor's contribution metric indicates a relative quantification and/or measurement of their contribution to the overall device graph. Due to the inclusion, in each transaction of the ledger, of a hash value of the previous transaction, the data employed to generate a contribution metric cannot be tampered with or altered without detection.

The method or process to determine the contribution metric, based on the references, pointers, or links, from graphs edges to transactions within the ledger, may be fully transparent and provided to all data contributors of the cooperative. However, as discussed above, the user data employed to generate the device graph and the contribution metric is confidential. That is, each data contributor only has access to their own user data, and only the trusted aggregator has access to all the user data. Various methods or processes may be employed to determine the contribution metric. However, generally, the more graph edges that a data contributor contributes to, the larger their contribution metric. In one embodiment, a contribution metric may be a relative fraction of the number of edges that the data contributor's user data contributed towards the determination of. Various embodiments for determining a contribution metric are discussed at least in conjunction with FIGS. 7B-7C.

Accordingly, because a data contributor need not expose their user data to other data contributors, and the other data contributors cannot tamper with the data employed to determine their contribution metric, a data contributor does not need to "trust" other data contributors within the cooperative. Furthermore, although a data contributor must trust the aggregator with the security of their anonymized user data, the data contributor need not trust the aggregator with the determination of the contribution metrics for each data contributor. As discussed below, the aggregator may generate a zero knowledge proof that provides an audit of the integrity of the determination of each contribution metric.

Each data contributor may verify the determination of their contribution metric based on the aggregator generated zero knowledge proof. Briefly, a zero knowledge proof may be generated by various zero knowledge protocols or methods, and enables one party (the aggregator) to prove to another party (a data contributor) that a given statement is true, without conveying any information apart from the fact that the statement is indeed true. According, via a zero knowledge proof protocol or method, the aggregator may prove to a data contributor that the data contributor's contribution metric, as determined by the aggregator, is consistent with the method employed to determine the contribution metric (which is transparent and provided to each data contributor), without revealing the other data contributor's user data to the data contributor. That is, the aggregator may prove to the data contributor that the data contributor's contribution metric was determined "truthfully," based on the aggregated user data, without having to provide the data contributor the aggregated user data.

Various zero knowledge protocols may be employed by the aggregator, such as but not limited to non-interactive zero knowledge proofs or protocols. For instance, various embodiments of zero knowledge proofs are discussed in (1985) "The Knowledge Complexity of Interactive Proof Systems," Shafi Goldwater, Silvio Micali, and Charles Rackoff, Proceedings of the Seventeenth Annual ACM Symposium on Theory of Computing, Stockholm, 1985, pages 291-304, the contents of which are incorporated by reference herein.

Via such non-interactive proofs, no cryptographic interaction between the aggregator and the data contributor is required for the aggregator to prove the integrity of the data contributor's contribution metric. In various non-limiting embodiments, a zero knowledge proof is generated based on a random oracle model using a Fiat-Shamir heuristic. That is, the zero knowledge proof may be based on a heuristic that creates or generates a digital signature based on an interactive proof of knowledge. For instance, a zero knowledge Succinct Non-Interactive Argument of Knowledge (zk-SNARK) method, process, or protocol may be employed by the aggregator to verify, for a data contributor, the integrity of the determination of the data contributor's contribution metric. More specifically, a zk-SNARK method enables the aggregator to generate a probabilistically-checkable-proof (PCP) employing quadratic arithmetic constraints.

In some embodiments that employ a zk-SNARK method to provide a verification of a data contributor's contribution metric, the data contributor may generate a pair of cryptographic keys: a prover key and a verifier key. The prover and verifier keys are separate from the keys employed to encrypt and decrypt the data contributor's user data. As discussed throughout, the method employed to determine a contribution metric is provided to each data contributor of the device cooperative. The method may be provided to the data contributors by providing the data contributors with the source code employed to determine the contribution metrics. That is, all data contributors have agreed upon the source code to calculate the contribution metrics. To generate the prover and verifier keys, the data contributor may cryptographically compile the source code used by the aggregator to determine and/or calculate their contribution metric. The data contributor may provide the prover key to the aggregator. The aggregator may employ the data contributor's prover key and the source code to generate a PCP. The aggregator provides the PCP to the data contributor. The data contributor may employ their verifier key to verify that their contribution metric was generated by the agreed-upon source code.

Various embodiments of zk-SNARK methods are discussed within the following reference: Ben-Sasson E., Chiesa A., Genkin D., Tromer E., Virza M. (2013) "SNARKs for C: Verifying Program Executions Succinctly and in Zero Knowledge." In: Canetti R., Garay J. A. (eds) *Advances in Cryptology—CRYPTO* 2013. *Lecture Notes in Computer Science, vol* 8043. Springer, Berlin, Heidelberg, which the contents of are herein incorporated by reference in their entirety. Other embodiments of zk-SNARK methods are discussed within the following reference: Ben-Sasson E., Chiesa A., Genkin D., Tromer E., Virza M. (2014) "Succintct Non-Interactive Zero Knowledge for a von Neuman Architecture." In *USENIX Security Symposium, pp.* 781-796. 2014, which the contents of are additionally herein incorporated by reference in their entirety.

However, briefly here, a zk-SNARK method may include the prover (e.g., the aggregator) compiling the source code employed to determine and/or calculate the verifier (e.g., the data contributor's) contribution metric into a quadratic arithmetic equation of polynomials (or constraint), e.g., $t(x)h(x)=w(x)v(x)$, where the equality holds if and only if the program is computed correctly, i.e., if the verifier's contribution metric is computed correctly from the source code. Thus, the prover's goal is to prove to the verifier that the equality holds. To simplify the problem from multiplying polynomials and verifying the equality at a single point, the verifier randomly samples a point in the domain of the equality: $s \in x$. The verifier keeps the value of s secret from the verifier. That is, the verification has be reduced to a single (secret) point: $t(s)h(s)=w(s)v(s)$, $s \in x$.

Prior to the verification process, the prover and verifier agree upon a homomorphic encoding or encryption function: E, where is at partially homomorphic, but need not be fully homomorphic. The above-discussed verifier-generated prover and verifier keys are key pairs for E. The verifier encrypts s, via their verifier key s, i.e., the verifier computes $E(s)$. The verifier provides $E(s)$ to the prover. Note that the prover key does not enable the prover to decrypt $E(s)$. Rather, based on the homomorphic properties of E, the prover employs their prover key and $E(s)$ to compute each of: $E(t(s))$, $E(h(s))$, $E((w(s))$, and $E(v(s))$. The prover need not know the value of s to compute these encrypted evaluations of the polynomials at a single point.

The prover may obfuscate the values of $E(t(s))$, $E(h(s))$, $E((w(s))$, and $E(v(s))$ by multiplying each by a (secret) scalar and provide the obfuscated values to the verifier. The verifier may verify the correct structure without knowledge of the actual encoded values. That is, the prover provides the verifier with each of $E(t(s))k$, $E(h(s))k$, $E((w(s))k$, and $E(v(s))k$, where k is unknown to the verifier. The verifier can prove the correctness of $t(s)h(s)=w(s)v(s)$, via the evaluation of $E(t(s))kE(h(s))k=E(w(s))kE(v(s))$, without the underlying knowledge of $E(t(s))$, $E(h(s))$, $E((w(s))$, $E(v(s))$, or k.

Accordingly, crowdsourced user data is employed to generate and/or update a device graph, as well as safeguard and verify the integrity of the device graph without exposing an data contributor's user data to other data contributors of the cooperative. Participating data contributors may automatically audit all uses of their user data in the generation/updating of a device graph. More particularly, a contribution metric that quantifies each data contributor's relative contribution to the device graph is determined. The references, links, and/or pointers from the device graph edges to the contributing transactions within the blockchained ledger enables the determination of the contribution metric for each data contributor, while ensuring that the user data that is employed to determine the contribution metric is secure and tamper-proof.

Furthermore, data contributors may reliably verify the determination of their contribution metrics via a generated zero sum proof. When generating and auditing a device graph, no data contributor is provided access to the user data provided by the other data contributors. The combination of the distributed ledger and various zero knowledge proof methodologies enable a data contributor to verify the determination of their contribution metric, without exposure to the user data provided by the other data contributors and without exposing their user data to the other data contributors. The workflow safeguards against any misuse of the cooperative resources, while detecting and preventing any tampering of the data employed to generate the device graphs and contribution metrics.

In the event that a data contributor terminates their inclusion with the cooperative, the embodiments enable withdrawal of a data contributor's user data. In such an event, the terminated data contributor's user data may be identified based on the references, links, and/or pointers encoded in the attribution data structure. Such withdrawn user data, identified via information included in an attribution data structure, may be ignored and/or vetoed for the next generation and/or update of the device graph. Accordingly, the terminated data contributor's user data will not contribute to the updated user graph. The terminated data contributor may verify that its data was appropriately withdrawn and that its withdrawn data does not contribute to the updated device graph. For instance, the terminated data contributor may continue to receive contribution metrics and zero sum proofs from the aggregator. Any non-zero contribution metric and/or unverifiable contribution metric alerts the terminated data contributor that their user data may still be contributing to the device graphs. Additionally, the embodiments enable the inclusion of any new data contributor and associated new user data into the workflow via the new data contributor including their user data within the public ledger.

Conventional device cooperatives do not employ blockchained ledgers to aggregate data contributor's user data. Furthermore, such conventional device cooperatives do not employ zero knowledge proof methodologies, such as but not limited to zk-SNARKs. Accordingly, by not employing blockchained ledgers, data contributors within a conventional device cooperative are not ensured that the user data employed to generate the device graph is tamper-proof. Thus, such data contributors may be worried about the integrity of the device graph, as well as any metric generated from the device graphs, such as but not limited to a contribution metric. Furthermore, without employing zero knowledge proofs, the methods of conventional device cooperatives do not enable the automatic auditing and verification of a data contributor's contribution to the overall device graph.

In such conventional cooperatives, to verify the actual contribution of a data contributor of the cooperative to the device graph, extensive manual auditing is required that requires the auditing body to access the data contributors' user data. Thus, because the data contributor's user data is exposed to the auditing body, such conventional device cooperatives cannot ensure the safeguarding of the data contributors' user data. Furthermore, conventional device cooperatives are not enabled to determine a contribution metric for each data contributor because conventional methods may lack the generation of references from device graph edges to transactions within a ledger. Additionally, conventional device cooperatives are not enabled to reliably "rollback" a device graph when a data contributor withdraws their user data. Even if a conventional device cooperative may withdraw a data contributor's contribution from the a device graph, the cooperative may not be able to provide an audit and confirmation of the withdraw via a zero knowledge verification, because the cooperative does not employ the combination of a blockchained ledger and a zero knowledge proof.

Example Operating Environment

FIG. 1 illustrates an exemplary operating environment 100 implementing various embodiments presented herein. Environment 100 includes a device cooperative 130 that includes an data aggregator and three data contributors: data_contributor_A, data_contributor_B, and data_contributor_C. Other embodiments of device cooperative 130 may include more or less data contributors. Each data contributor may operate an online platform such as but not limited to a social network, a news article aggregator, an electronic-commerce platform, a content streaming platform, online communities, or the like. For nomenclature purposes herein, data_contributor_A operates online platform_A, data_contributor_B operates online platform_B, and data_contributor_B operates online platform_C. For exemplary purposes, platform_A may be a social network, platform_B may be an online marketing platform, and platform_c may be a ride sharing platform.

The data aggregator may provide various device graph services, such as those discussed herein. Accordingly, aggregator may operate one or more server computing devices, such as server device 132, to provide the device graph services discussed herein. Server device may host a device cooperative engine, device cooperative engine 142. An examplary, but non-limiting embodiment of a device cooperative engine is discussed in conjunction with device cooperative engine 320 of FIG. 3. However, briefly, the aggregator may employ device cooperative engine 142 to provide various device cooperative services, such as but not limited to generating/updating a device graph, determining contribution metrics for each data contributor of device cooperative 130, and providing contribution metric verification services for each data contributor.

To operate platform_A, data_contributor_A may operate server computing device 134. To operate platform_B, data_contributor_B may operate server computing device 136. To operate platform_C, data_contributor_C may operate server computing device 138. Although represented as a single server device in FIG. 1, any of server devices 132-138 may include a plurality of server computing devices. Any of the server devices may be distributed in a "cloud" configuration. Environment 100 may include one or more storage devices, schematically represented as storage device 140. Any of the data contributors may access and/or employ storage device 140, via communication network 120, to provide platform services, including device graph services. For instance, storage device 140 may store at least portions of a ledger, such as but not limited to public ledger 144, as discussed herein. Various embodiments of ledger 144 are discussed in conjunction with at least public 310 of FIG. 3 and blockchained ledger 400 of FIG. 4A.

A general or specific communication network, such as but not limited to communication network 120, may communicatively couple at least the aggregator's service computing device 132 with each of the data contributor server computing devices 134, 136, and 138, as well as storage device 140. Communication network 120 may be any communication network, including virtually any wired and/or wireless communication technologies, wired and/or wireless communication protocols, and the like. Communication network 120 may be virtually any communication network that communicatively couples a plurality of computing devices and storage devices in such a way as to enable the computing devices to exchange information via communication network 120.

Storage device 140 may include volatile and non-volatile storage of digital data. Storage device 140 may include non-transitory storage media. Communication network 120 may communicatively couple storage device 140 to any of user computing devices 102-118 and/or any of server computing devices 132-138. In some embodiments, storage device 140 may be a storage device distributed over multiple physical storage devices. Thus, storage device 140 may be a virtualized storage device. For instance, one or more "cloud storage" services and/or service providers may provide, implement, and/or enable storage device 140. Such cloud services may be provided by a third party.

Environment 100 includes three users: user_A, user_B, and user_C. Each user may operate one or more user computing devices to access the services one or more online platforms, such as but not limited to platform_A, platform_B, and platform_C. For a non-limiting exemplary embodiment, user_A may employ smartphone 102 and smartwatch 104 to access services provided by platform_A, while employing laptop 106 to access services provided by platform_C. Similarly, user_B may employ virtual reality (VR) headset 108 to access services provided by platform_A, desktop 110 to access services provided by platform_B, and tablet 112 to access services provided by platform_C. User_C may employ augmented reality (AR) eyeglasses 114 to access services provided by platform_B, while employing smart television (TV) set 116 and virtual assistant (VA) device 118 to access the services of platform_C.

Other embodiments of environment 100 may include additional and/or alternative users and data contributors. The data contributors within device cooperative 130 may operate additional and/or alternative online platforms. Each user within environment 100 may employ additional and/or alternative computing devices to access the services of the online platforms. An exemplary, but non-limiting embodiment of a computing device, such as user computing devices 102-118 and server computing devices 132-138, is discussed in conjunction with at least computing device 900 of FIG. 9.

Example Device Graph

Figure 3:
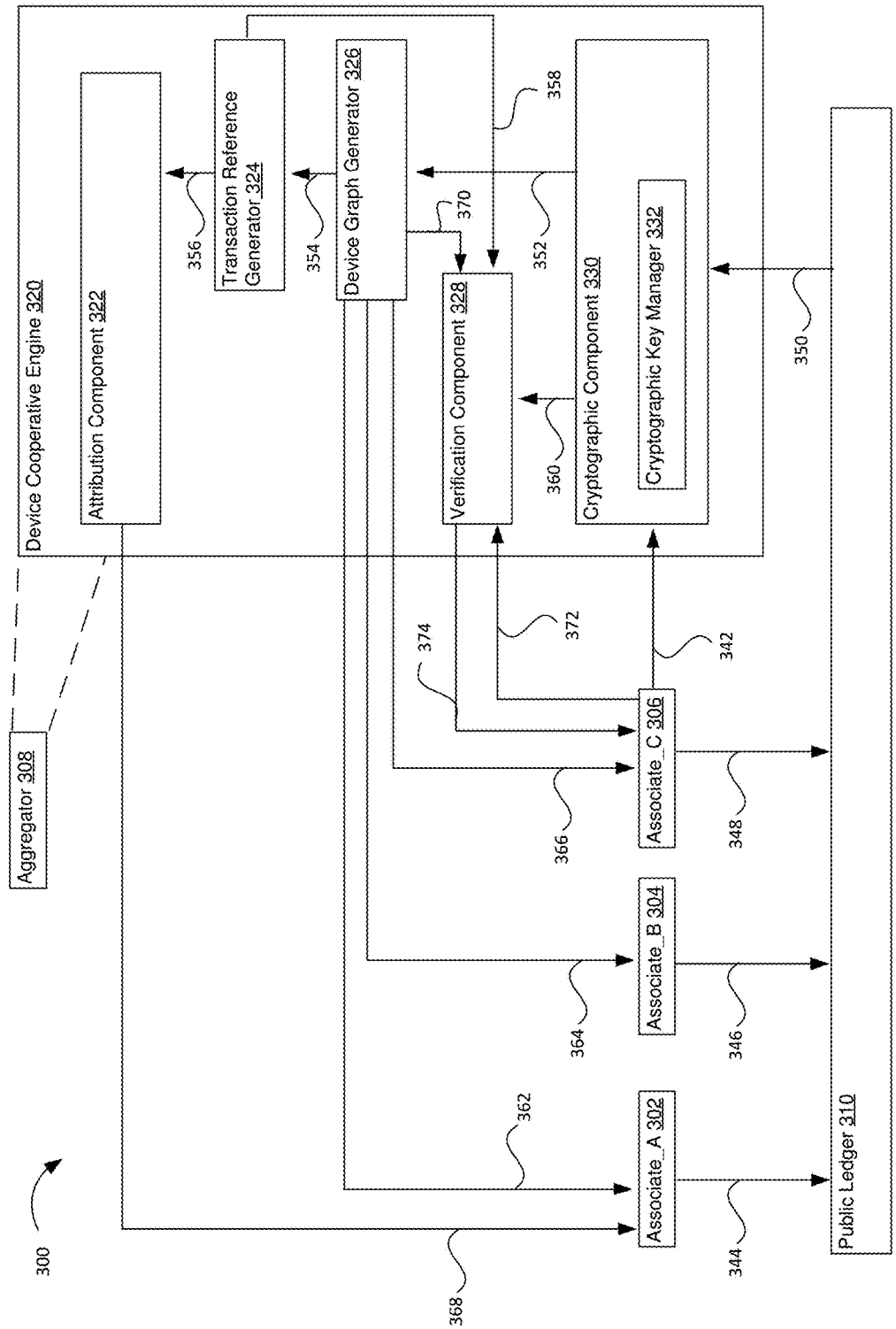
FIG. 3 illustrates an exemplary, but non-limiting, embodiment of a workflow for generating, securing, and verifying a device graph that is consistent with the various embodiments presented herein.

FIG. 2 illustrates one non-limiting embodiment of a device graph 200. As discussed throughout, an data aggregator of a device cooperative, such as device cooperative 130 of FIG. 1, generates a device graph, such as device graph 200, and provides the device graph to the data contributors of the device cooperative. More specifically, a device cooperative engine, such as but not limited to device cooperative engine 142 of FIG. 1 and/or device cooperative engine 320 of FIG. 3, is employed by an aggregator of a device cooperative to generate device graph 200. In various embodiments, a device graph generator, such as but not limited to device graph generator 326 of device cooperative engine 320, at least partially enables the generation and/or updating of device graph 200. As discussed in conjunction with device graph data structure 440 of FIG. 4B, a device graph, such as but not limited to device graph 200 may be encoded in a device graph data structure.

As shown in FIG. 2, a device graph, such as device graph 200, may include a hierarchy that maps devices and connects them to individual user's, via graph edges. In some embodiments, the users are anonymized. That is, even though the device graph maps or connects, via graph edges, one or more devices to an individual user, the user's identity as a real-life person is not identifiable from the device graph.

More specifically, via user data provided by the data contributors of the cooperative, the aggregator may cluster devices around users. A device may be linked to a user via a graph edge. The clustering of devices around anonymized users may be enabled via any deterministic and/or statistical clustering method or algorithm. The aggregator may analyze deterministic and probabilistic user data provided by the data contributors. For instance, the aggregation of the data contributors' user data may reveal a user's unique preferences, behaviors, and online consumption patterns. The aggregator inferring such patterns may enable the clustering of specific devices around users, allowing for the generation of graph edges from a device to an anonymized user.

A device graph, such as but not limited to device graph 200, may include a set of user nodes, a set of device nodes, and a set of graph edges connecting the user nodes and graph nodes. As shown in FIG. 2, device graph 200 includes three user-device clusters. A user-device cluster may include at least one user node and at least one device node. For instance, three user nodes are shown in FIG. 2: user_A, user_B, and user_C. Eighteen cluster nodes are also shown in FIG. 2, such as but not limited to: device_A, device_B, device_CC, device_DD, device_EEE, and device_FFF. First user-device cluster 210 connects (via graph edges) user node user_A to six device nodes: device_A, device_B, device_C, device_D, device_E, and device_F. Second user-device cluster 220 connects user node user_B to another six another device nodes: device_AA, device_BB, device_CC, device_DD, device_EE, and device_FF. Third user-device cluster 230 connects user node user_C to still another six device nodes: device_AAA, device_BBB, device_CCC, device_DDD, device_EEE, and device_FFF. Referring back to environment 100 of FIG. 1, device_A may include smartphone 102, device_B may include smartwatch 104, and device_C may include laptop 106. As discussed in conjunction with FIG. 1, user_A may employ additional devices not shown in FIG. 1, such as but not limited to device_D, device_D, and device_F. Similarly, device_AA may include VR headset 108, device_BB may include desktop 110, and device_CC may include tablet 112. Device_AAA may include AR eyeglasses 114, device_BBB may include smart TV set 116, and device_CCC may include VA 118.

Device graph 200 may include deterministic edges and probabilistic edges. In FIG. 2, deterministic edges are represented as solid graph edges, while probabilistic edges are represented as hashed graph edges. For instance, first user-device cluster 210 includes deterministic graph edge 212, probabilistic graph edge 214, and probabilistic edge 216. Second user-device cluster 220 includes deterministic graph edge 222 and probabilistic graph edge 224. Third user-device cluster 230 includes deterministic graph edge 232 and probabilistic graph edge 234. Deterministic edges indicate a deterministic mapping (i.e., probability=1.0) of a device to a user.

Deterministic edges may be determined based on deterministic data included in the data contributors' user data, such as but not limited to a user logging onto a data contributor's platform by providing authenticated logon credentials via a specific device, For instance, user_A may have logged onto platform_A by providing an authenticated credential's via device_B. Data_contributor_A's user data may be employed to generate deterministic edge 212 between device_B and user_A. A device may be uniquely and deterministically identified via a MAC address, a device ID, or any other unique and deterministic identifier. As discussed throughout, in the various embodiments, by the data contributors anonymizing their user data, user_A's identity may be anonymized. That is, neither the aggregator, nor any of the data contributors may be provided the identity of user_A via device graph 200.

In contrast to deterministic edges, probabilistic graph edges indicate a probabilistic mapping (probability<1.0) of a device to a user. Probabilistic edges may be determined based probabilistic data included in the data contributors' user data, such as but not limited to user browsing behavior, preferences, and patterns. Other probabilistic user data includes IP addresses, operating systems, identifiers for advertising (IDFAs), Google™ advertising IDs (AAID or GAIDs), and the like. In one exemplary, but non-limiting embodiment, user_A browses the services of platform_B, via device_A, without logging onto platform_B, i.e., user_A anonymously browses platform_B. Platform_B's user data includes the device_A's IP address in the user data provided to the aggregator. User_A may later employ device_E to anonymously browse platform_C, which is now assigned the same address as the IP address assigned to device_A when anonymously browsing platform_B. Platform_C's user data includes the same IP address in their user data provided to the aggregator. When generating device graph 200, the aggregator may then probabilistically connect device_A and device_E. Via additional probabilistic analyses, the aggregator may probabilistically connect device_A and device_E to the anonymized user_A, and generate probabilistic graph edges 214 and 216. As shown in FIG. 2, each probabilistic edge may include a probability that is less than unity. In contrast, as shown by deterministic edge 122, the probability for a deterministic edge may be approximately unity.

Example Workflow

FIG. 3 illustrates an exemplary, but non-limiting, embodiment of a workflow 300 for generating, securing, and verifying a device graph that is consistent with the various embodiments presented herein. In workflow 300, a device cooperative includes the data aggregator 308, as well as three data contributors: data_contributor_A 302, data_contributor_B 304, and data_contributor_C. It should be understood that the device cooperatives of the various embodiments may include more or less data contributors.

In the various embodiments, the data contributors of the device cooperative periodically provide their anonymized and encrypted user data, as transactions within a public ledger 310. For instance, each data contributor may provide their user data to the public ledger 310 via an hourly, daily, weekly, bi-weekly, monthly, or yearly schedule. In some embodiments, public ledger 310 may be a blockchained ledger. The device cooperative's aggregator 308 may employ a device cooperative engine, such as device cooperative engine 320 to enable workflow 300. A server computing device, such as server device 132 of FIG. 1 may implement device cooperative engine 320. Device cooperative engine 320 is generally responsible for decrypting and aggregating the user data to generate and/or update a device graph. Device cooperative engine 300 is also responsible for determining and providing a contribution metric to each data contributor, as well as providing a zero knowledge proof to each data contributor regarding the integrity of the determination of their contribution metric.

Device cooperative engine 320 may include an attribution component 322, a transaction reference generator 324, a graph generator 326, a verification component 328, and a cryptographic component 330. Cryptographic component 330 may include a cryptographic key manager 332. Briefly, cryptographic component 330 is generally responsible for accessing the public ledger 310, and decrypting the data contributor's user data written as transactions within the public ledger 310. The cryptographic key manager 332 manages and secures the data contributor's cryptographic keys. The data contributor's cryptographic keys are employed by the cryptographic component 330 to decrypt the data contributor's user data. For instance, each data contributor may provide decryption keys to the aggregator, the data contributor's keys being managed by the cryptographic key manager 332. More particularly, the aggregator may store and safeguard the data contributor's decryption keys via cryptographic key manager 332.

The device graph generator 326 is generally responsible for generating and/or updating the device graph, as well as providing the device graph to each data contributor. Device graph generator 326 may be responsible for encoding the generated/updated device graph in a device graph data structure, such as but not limited to device graph data structure 440 of FIG. 4B. Device graph generator 326 may additionally "roll-back" the device graph when one or more data contributors withdraw their user data from the cooperative. Transaction reference generator 324 is generally responsible for generating, for each graph edge, one or more references, links, and/or pointers that indicate the one or more transactions in public ledger 310 that contributed to the edge. Attribution component 322 employs the links to the public ledger 310 to determine and provide a contribution metric to each data contributor in the device cooperative. Attribution component may employ one or more methods discussed in conjunction with FIGS. 7B-7C to determine, generate, and/or calculate a contribution metric for each of the data contributors. Verification component 328 employs the links to the public ledger 310 to generate and provide a zero knowledge proof of the integrity of the determination of their contribution metric to each data contributor.

The various actions, steps, or processes of workflow 300 performed by the data contributors may be enabled by each data contributor employing computing devices communicatively coupled to the aggregator's computing device implementing and/or hosting device cooperative engine 320, via a communication network. For instance, data_contributor_A 302 may employ server device 134 of FIG. 1 to communicate with aggregator's server device 132, via communication network 120 of FIG. 1. Data_contributor_B 304 may employ server device 136 of FIG. 1 to communicate with aggregator's server device 132 via communication network 120. Data_contributor_C 306 may employ server device 138 of FIG. 1 to communicate with aggregator's server device 132 via communication network 120.

The various steps of workflow 300 will now be briefly discussed. At step 342 in workflow 300, data_contributor_C 306 provides its cryptographic keys to the aggregator's device cooperative engine 320. For example, data_contributor_C may provide decryption keys to the aggregator. Device cooperative engine 320 may employ cryptographic key manager 332 to manage and secure data_contributor_C's 306 cryptographic keys. Although not shown as explicit steps in FIG. 3, each of data_contributor_A 302 and data_contributor_B 304 may provide their cryptographic keys to device cooperative engine 320. Accordingly, cryptographic key manager 332 may manage and secure the cryptographic keys of each data contributor included in the device cooperative.

At step 344, data_contributor_A 302 provides their user data to a public ledger 310. Various embodiments of public ledgers are discussed in conjunction with ledger 400 of FIG. 4A. However, briefly here, at step 344, data_contributor_A 302 may encrypt their user data in a manner such that the user data may be decrypted with data_contributor_A's cryptographic key, which is managed and secured via cryptographic key manager 332. Note that the other data contributors may not have access to data_contributor_A's cryptographic key. The only party other tha data_contributor_A that has access to data_contributor_A's cryptographic keys is the aggregator, via cryptographic key manager 332. In addition to being encrypted, data_contributor_A's 302 user data may be anonymized such that even when decrypted, data_contributor_A's 302 user data need not specifically indicate the real-life identity of associate_A's 302 users.

At step 344, data_contributor_A 302 may write their anonymized and encrypted data, as a transaction in public ledger 310. Public ledger 310 may be a blockchained ledger, as shown via ledger 400 of FIG. 4A. As such, when writing user data to a new transaction in public ledger 310, a hash value of the previous transaction may be written to the current transaction. A publicly, or at least widely, available hash function may be employed to generate the hash value of a transaction in the public ledger 310. As such, even though other data contributors are not able to decrypt data_contributor_A's 302 user data, because the hash function employed to generate the hash value of transactions is a widely available hash function, any data contributor of the device cooperative may detect tampering and/or editing of data included in public ledger 310. At step 346, data_contributor_B 304 writes their encrypted and anonymized user data as another transaction in the public ledger 310. At step 348, data_contributor_C 306 writes their encrypted and anonymized user data as still another transaction in public ledger 310. In various embodiments, the data contributors periodically provide their user data to the public ledger 310. That is, the data contributors may repeat steps 344, 346, and 348 on an hourly, weekly, bi-weekly, monthly, or yearly basis, as well as virtually any time-scheduled basis.

At step 350, device cooperative engine 320 may access any new transactions added to public ledger 310, such as but not limited to the transactions added via steps 344-348 of workflow 300. The cryptographic component 330 of device cooperative engine 320 may employ each data contributor's cryptographic keys managed via cryptographic key manager 332 to decrypt the user data provided by each data contributor.

At step 352, the cryptographic component 330 provides the decrypted user data for each data contributor to the device graph generator 326. The device graph generator 326 may aggregate the data contributors' user data. The device graph generator 326 may generate and/or update the device graph based on the aggregated user data. Device graph generator 326 may employ various methods for generating and/or updating a device graph may be employed by the device graph generator 326. Some exemplary, but non-limiting embodiments of methods that device graph generator 326 may employ are discussed in U.S. patent application Ser. No. 14/959,890, entitled CROSS-DEVICE CONSUMER IDENTIFICATION AND DEVICE TYPE IDENTIFICATION, file on YYZ, 2017, the contents of which are herein incorporated in their entirety. An exemplary, but non-limiting embodiment of such a device graph generated by device graph generator 326 is discussed in conjunction with FIG. 2. A device graph generated and/or updated by device graph generator 326 may be functionally referenced as G.

At step 362, device graph generator 326 provides G to data_contributor_A 302. At step 364, device graph generator 326 provides G to data_contributor_B 304. At step 366, device graph generator 326 provides G to data_contributor_C 306. At step 354, device graph generator 326 provides G to transaction reference generator 324 of device cooperative engine 320.

For each graph edge in G, transaction reference generator 324 generates a list of references or links to each transaction in public ledger 310 that contributed to the edge. The list of references for each graph edge may be encoded in an attribution data structure, such as attribution data structure 430 discussed in conjunction with FIG. 4B. At step 356, the transaction reference generator 324 provides the attribution data structure to the attribution component 322. The attribution data structure may be referred to as R.

Attribution component 322 may determine a contribution function that includes a contribution metric for each data contributor, based on the user data contributions provided by the data contributors. Various embodiments for determining and/or calculating a contribution metric are discussed at least in conjunction with FIGS. 7B-7C. In one such embodiment, each data contributor may be reference by data contributor index (a_id). The contribution function may be referred to as $F(G, R, a\_id)$. In various embodiments, F takes as input, the device graph (G), the list of ledger references for each graph edge (R), and a data contributor index (a_id) and return a contribution metric (c_a_id) for the data contributor indicated by the data contributor index. In various embodiments, each data contributor receives attribution for each of their edge-level contributions to the device graph. That is, the contribution metric for a data contributor indicates their relative contribution (via edge-level contributions) to the overall device graph.

The method to determine the contribution metric may be fully transparent and made available to all data contributors of the cooperative. However, the user data employed to generate the device graph and the contribution metric is confidential. That is, each data contributor only has access to their user data, and only the trusted aggregated has access to all the user data. Various methods may be employed to determine the contribution metric. However, generally, the more graph edges that a data contributor contributes to, the larger their contribution metric. In one embodiment, a contribution metric may be a relative fraction of the number of edges that the data contributor's user data contributed towards the determination of. For instance, in one exemplary, but non-limiting embodiment, data contributor A's contribution metric may be 29.5%, data_contributor_B's contribution metric may be 41.3%, and data_contributor_C's contribution metric may be 29.2%. At step 368, the attribution component 322 provides data_contributor_A's contribution to data_contributor_A 302. Although not shown as explicit steps in workflow 300, attribution component 322 may provide each of data_contributor_B and data_contributor_C 306 their respective contribution metrics for the device graph.

Because the data contributors do not have access to the underlying data that contributes to the determination of their contribution metrics, data contributors may desire a verification of the integrity of the determination of their respective contribution metric. At step 372, data_contributor_c 306 requests a verification of the integrity of the determination of their contribution metric. More specifically, at step 372, data_contributor_c 306 may generate their prover and verifier keys by cryptographically compiling agreed-upon source code for the determination of their contribution metric. Data_contributor_C 306 provides the verification component 328 with the prover key. Verification component 328 generates a probabilistically-checkable-proof (PCP) based on a zk-SNARM method, the prover key, and the source code.

At step 370, device graph generator 326 provides the device graph to verification component 328. The verification component 328 of the device cooperative engine 320 may generate a zero knowledge proof for data_contributor_c 306. For instance, verification component 328 may employ a zk_SNARK method to generate the zero knowledge proof, in the form of the above PCP, for data_contributor_c 306. At step 374, verification component 328 provides the zero knowledge proof to data contributor 306 for verification of their contribution metric. That is, at step 373, verification component 328 provides the PCP to data_contributor_C 306. Although, not explicitly shown in workflow 300, each of data_contributor_A 302, data_contributor_B 304, and data_contributor_C 306 may similarly request and receive zero knowledge proofs for verification of their contribution metrics.

Example Blockchained Ledger

Figure 4A:
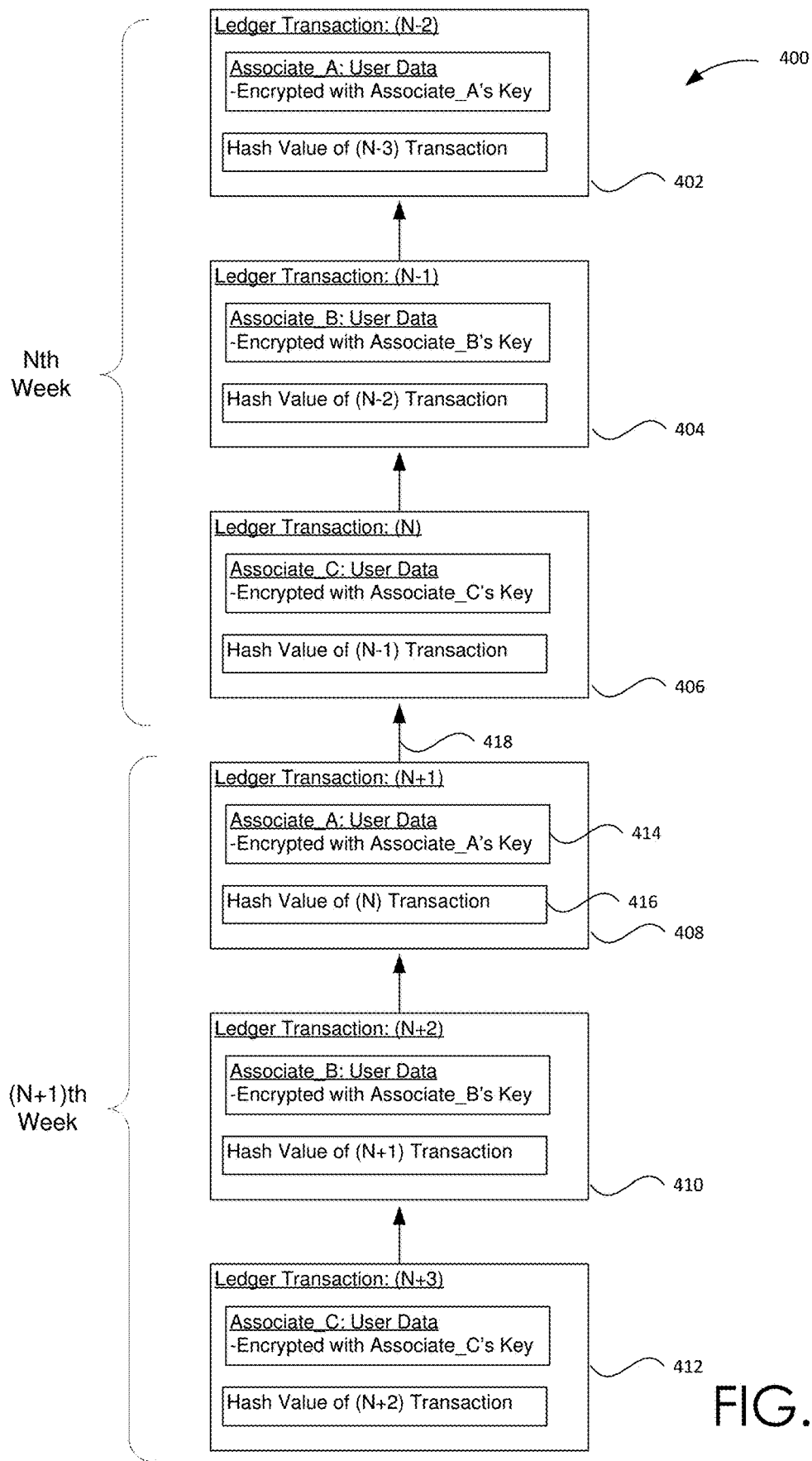
FIG. 4A illustrates an exemplary, but non-limiting, embodiment of a blockchained ledger that is consistent with the various embodiments discussed herein.

FIG. 4A illustrates an exemplary, but non-limiting, embodiment of a blockchained ledger 400 that is consistent with the various embodiments discussed herein. For instance, public ledger 144 of FIG. 1 and/or public ledger 310 of FIG. 3 may be similar to blockchained ledger 400. As such, as least portions of blockchained ledger 400 may be stored in storage 140 of FIG. 1. Blockchained ledger 400 may be a distributed ledger, such that at least portions of blockchained ledger 400 are distributed to the various data contributors of a device cooperative, as discussed herein.

FIG. 4A shows six consecutive indexed ledger transactions within ledger 400. Ledger transaction 402 is indexed as the (N−2) transaction of ledger 400, while ledger transaction 404 is indexed as the (N−1) transaction and ledger transaction 406 is indexed as the Nth transaction. Similarly, ledger transaction 408 is indexed as the (N+1) transaction, ledger transaction 410 is indexed as the (N+2) transaction, and transaction ledger 412 is indexed as the (N+3) transaction.

Referring back to FIG. 3, ledger 400, as shown in FIG. 4A, may have been generated after (N+1) weekly iterations of workflow 300. For instance, during the Nth week of workflow 300, at step 344, data_contributor_A's nth batch of user data may have been written to transaction 402. Similarly, at step 346, data_contributor_B's nth batch of user data is written to transaction 404, and at step 348, data_contributor_C's nth batch of user data is written to transaction 406. During the (N+1) week of workflow 300, at step 344, data_contributor_A's (N+1) batch of user data is written to transaction 408, at step 346, data_contributor_B's (N+1) batch of user data is written to transaction 410, and at step 348, data_contributor_C's (N+1) batch of user data is written to transaction 412. Prior to being written into transactions within ledger 400, each batch of user data may be anonymized and encrypted with encryption keys of each data contributor.

An exemplary, but non-limiting embodiment, of a ledger transactions is shown via ledger transaction 408. Ledger transaction 408 includes data_contributor_A' user data 414. As noted throughout, data_contributor_A may have anonymized and encrypted their user data prior to it being written to ledger transaction 408. Because ledger 400 is a blockchained ledger, transaction 408 includes a hashed value 416 of the previous transaction (i.e., transaction 406). The hash function employed to generate hash value 408 may be publicly, or at least widely available.

As indicated by the arrows in FIG. 4A, each transaction includes a reference, link, or pointer, to the previous transaction, of which it includes a hash value of. For instance, arrow 418 indicate a reference, link, or pointer included in transaction 408 to 406. By a reverse traversal of the transactions, via the references, and employing the widely available hash function, each data contributor of the device cooperative may confirm that the user data employed to generate the device graphs and determine the contribution metrics, has not been tampered with. Furthermore, such tamper-proofing does not require access to the user data included in each transaction to be decrypted.

Example Structured Data for Device Graphs and Attribution References

Figure 4B:
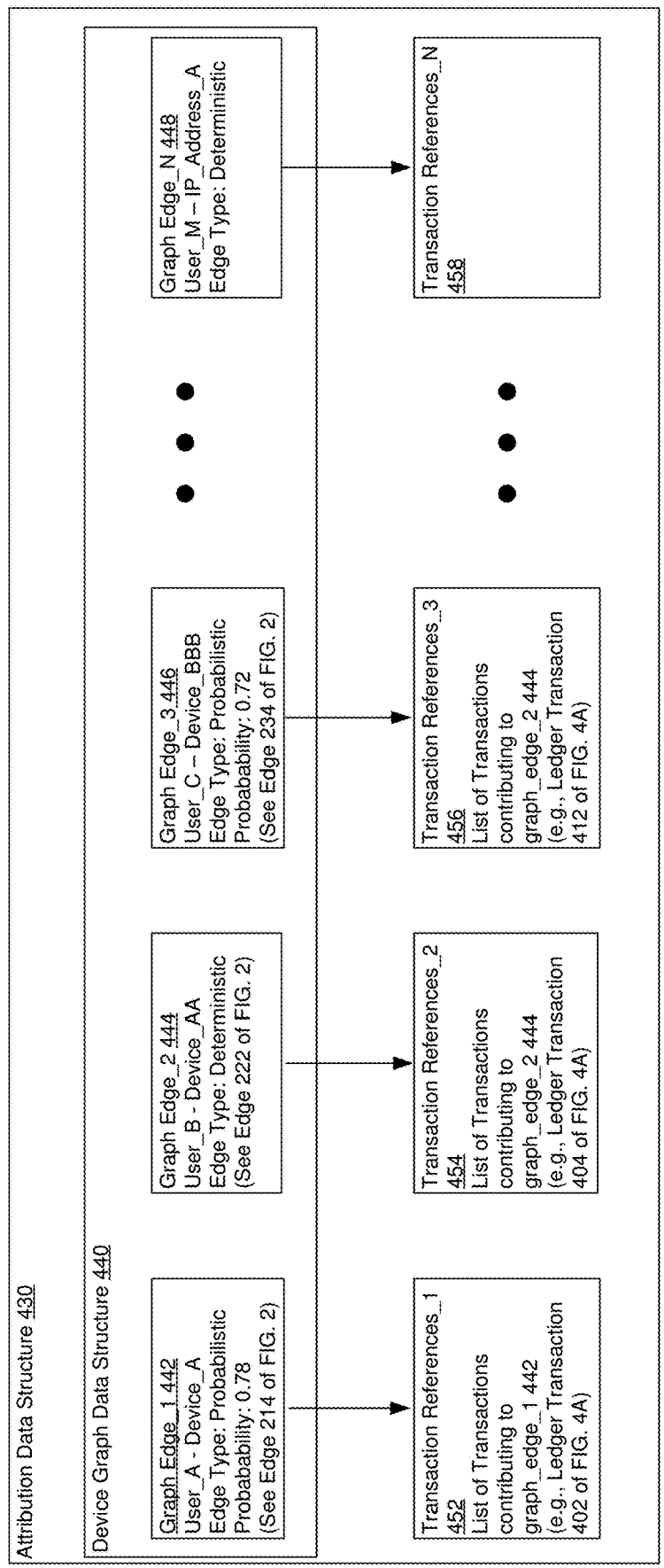
FIG. 4B illustrates exemplary, but non-limiting, embodiments of an attribution data structure and a device graph data structure that are consistent with the various embodiments.

FIG. 4B illustrates exemplary, but non-limiting, embodiments of an attribution data structure 430 and a device graph data structure 440 that are consistent with the various embodiments. A device cooperative engine, such as but not limited to device cooperative engine 142 of FIG. 1 and/or device cooperative engine 320 of FIG. 3, may be generally responsible for generating and/or updating a device graph data structure, such as but not limited to device graph data structure 440, as well as an attribution data structure, such as but not limited to attribution data structure 430.

A device graph data structure, such as but not limited to device graph data structure 440, may encode and/or indicate a device graph, a subset of which includes device graph 200 of FIG. 2. In some embodiments, a device graph generator encodes a device graph in a device graph data structure. For example, device graph generator 326 of device cooperative engine 320 generated device graph data structure 440 to encode a device graph, a subset of which includes device graph 200 of FIG. 2. The device graph encoded in a device graph data structure 440 includes N graph edges, mapping a plurality of devices to M users, where M and N are positive integers.

A device graph data structure may include a graph edge data structure for each graph edge included in the encoded device graph. As such, graph edge data structure 440 include N graph edge data structures: graph_edge_1 442, graph_edge_2 444, graph edge_3, . . . , and graph_edge N 448. Each graph edge data structure may encode the corresponding graph edge. As such. Each graph edge data structure may encode a reference to each of a user and a device that indicates connection, correlation, correspondence, association, or mapping between the referenced user and the referenced device, as shown in the device graph. Each graph edge data structure may indicate the edge type of the encoded graph edge: deterministic or probabilistic. If the edge type is probabilistic, the graph edge data structure may indicate the probability associated with the encoded probabilistic graph edge. For instance, graph_edge_1 442 encodes probabilistic graph edge 214 of device graph 200. Graph_edge_2 244 encodes deterministic graph edge 222 of device graph 200 and graph edge_3 446 encodes probablistic graph edge 234 of graph 234. As shown by graph_edge_N 448, in some embodiments, a graph edge data structure may indicate an IP address that is mapped to a user and/or a device based on user data.

As shown in FIG. 4B, in some embodiments, an attribution data structure may include a device graph data structure, such as attribution data structure 430 including device graph data structure 440. In other embodiments, an attribution data structure need not include a device graph data structure. In some embodiments, a transaction reference generator generates and/or update an attribution data structure. For instance, transaction reference generator 324 of device cooperative engine 320 generated attribution data structure 430 based on a device graph data structure, such as but not limited to device graph data structure 430 and a ledger, such as but not limited to public ledger 144 of FIG. 1, public ledger 310 of FIG. 4, or blockchained ledger 400 of FIG. 4A.

For each edge included in a device graph, attribution data structure 430 includes a list of references, links, and/or pointers to one or more transactions in a ledger, such as blockchained ledger 400 that contributed to the graph edge. More specifically, for each graph edge, a list is generated that includes a reference to each transaction in the ledger that contributed to the determination of the encoded edge. Transaction references_1 452 includes a list of references, links, and/or pointers to each ledger transaction that contributed to the determination of the graph edge encoded by graph edge_1 442, e.g., device edge 214 of device graph 200. For example, transaction references_1 452 may include a reference, link, and/or pointer to ledger transaction 402 of ledger 400. Likewise, transaction references_2 454 includes a list of references, links, and/or pointers to each ledger transaction that contributed to the determination of the graph edge encoded by graph edge_2 444, e.g., device edge 222 of device graph 200. That is, transaction references_2 454 may include a reference, link, and/or pointer to ledger transaction 404 of ledger 400. Transaction references_3 456 includes a list of references, links, and/or pointers to each ledger transaction that contributed to the determination of the graph edge encoded graph edge_3 446, e.g., device edge 234 of device graph 200. In various embodiments, transaction references_3 456 may include a reference, link, and/or pointer to ledger transaction 412 of ledger 400. Transaction references_N 458 may include a similar list of references, links, and/or pointers for the determination of the graph edge encoded by graph edge_N 448.

Generalized Processes for Providing Device Graph Services

Processes 500-820 of FIGS. 5-8B will now be discussed. Processes 500-820, or portions thereof, may be performed and/or executed by any computing device, such as but not limited to user computing devices 102-118 and server computing devices 132-138 of FIG. 1, as well as computing device 900 of FIG. 9. Additionally, a device cooperative engine, such as but not limited to device cooperative engine 142 of FIG. 1 and/or device cooperative engine 320 of FIG. 3, may perform and/or execute at least portions of processes 500-820.

Figure 5:
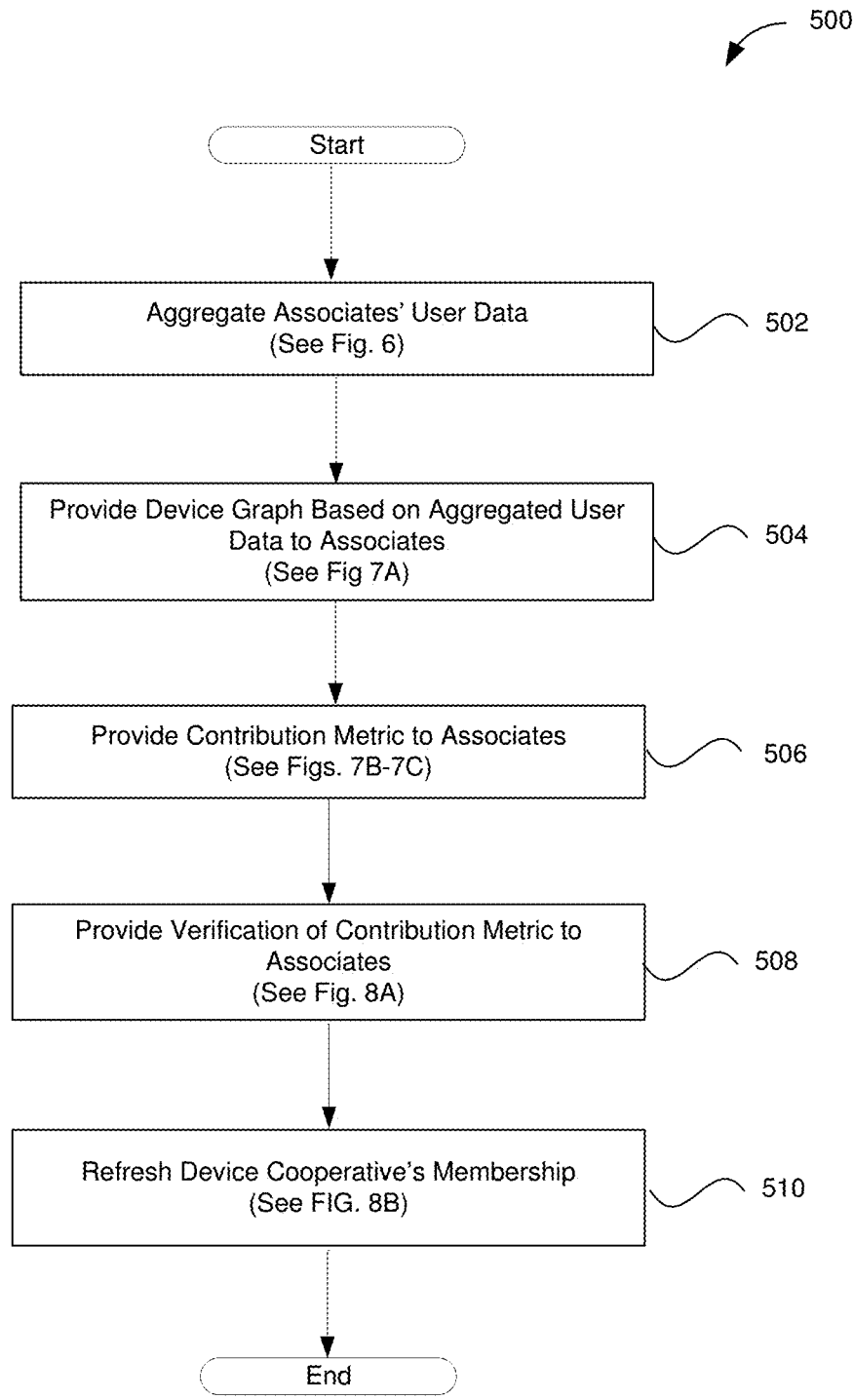
FIG. 5 illustrates one embodiment of a process flow for providing enhanced device graph services to data contributors of a device cooperative that is consistent with the various embodiments presented herein.

FIG. 5 illustrates one embodiment of a process flow for providing enhanced device graph services to data contributors of a device cooperative that is consistent with the various embodiments presented herein. A device cooperative engine, such as but not limited to device cooperative engine 142 of FIG. 1 and/or device cooperative engine 320 of FIG. 3, may be enabled to perform at least portions of 500. Process 500 begins, after a start block, at block 502, where the user data of the data contributors is aggregated. Various embodiments of aggregating the data contributors' user data are discussed in conjunction with process 600 of FIG. 6. At block 504, a device graph based on the aggregated user data is provided to the data contributors. Various embodiments for providing a device graph based on aggregated user data are discussed in conjunction with process 700 of FIG. 7A. At block, 506, contribution metrics are provided to the data contributors. Various embodiments for generating, determining, and/or providing contribution metrics to the data contributors are discussed in conjunction with process 720 of FIG. 7B and FIG. 7C. At block 508, a verification of the contribution metric is provided to the data contributors. Various embodiments for providing a verification of the contribution metric are discussed in conjunction with process 800 of FIG. 8A. In various embodiments, test inputs may be generated for the verification of the contribution metric. In some embodiments, the inputs are randomized, while in other embodiments, the test inputs are customized. In at least one embodiment, the inputs are handcrafted. In block 510, the device cooperative is refreshed. For instance, the data contributors that are included in the cooperative may be refreshed at block 510. Various embodiments for refreshing the inclusion of data contributors within the device cooperative are discussed in conjunction with process 820 of FIG. 8B.

Figure 6:
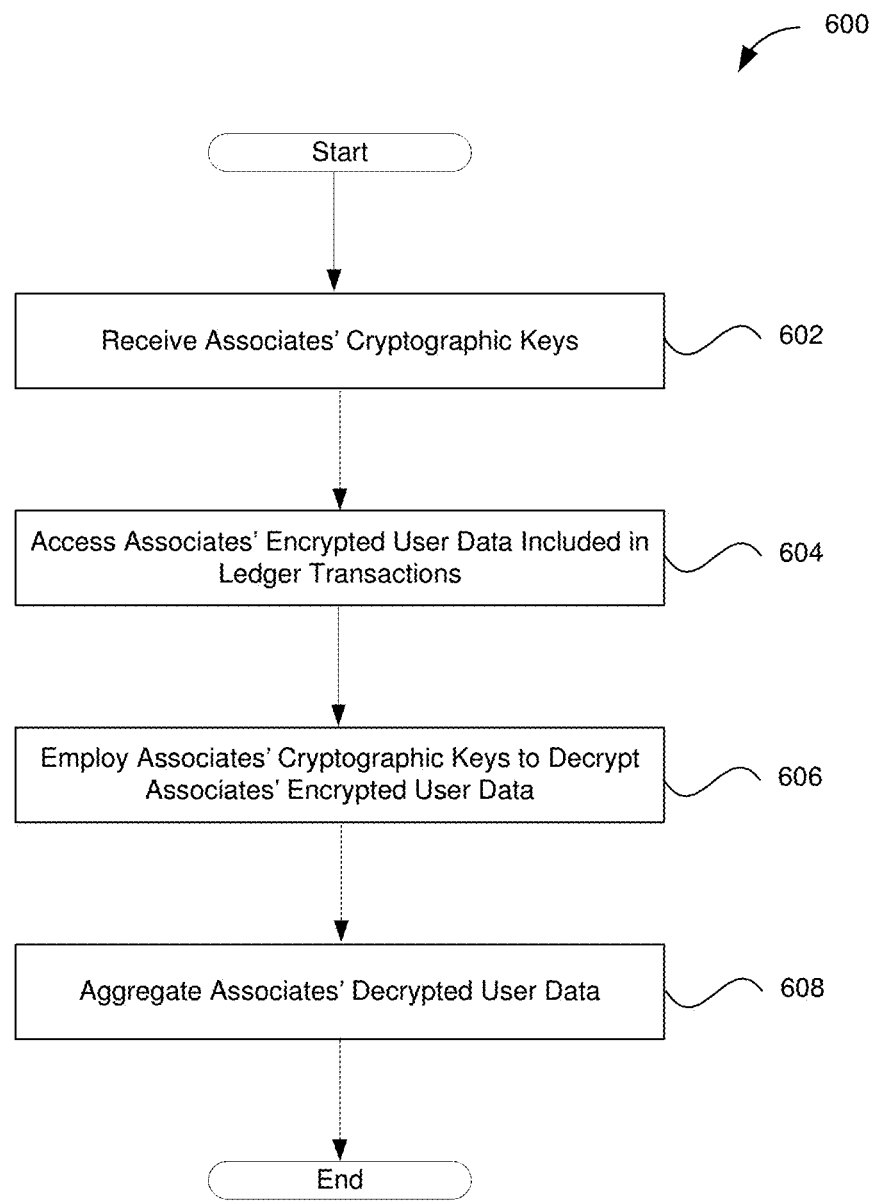
FIG. 6 illustrates one embodiment of a process flow for aggregating the user data of data contributors of a device cooperative that is consistent with the various embodiments presented herein.

FIG. 6 illustrates one embodiment of a process flow for aggregating the user data of data contributors of a device cooperative that is consistent with the various embodiments presented herein. Process 600 begins, after a start block, at block 602, where the data contributors' cryptographic keys are received. The cryptographic keys may be received by a cryptographic key manager, such as cryptographic key manager 332 of FIG. 3. At block 604, the data contributor's encrypted user data is accessed. The user data may be distributed within ledger transactions. Various embodiments of a ledger that includes a plurality of ledger transactions is discussed in conjunction with blockchained ledger 400 of FIG. 4A. At block 606, the data contributors' cryptographic keys are employed to decrypt the data contributors' encrypted user data. A cryptographic component, such as cryptographic component 330 of FIG. 3 may decrypt the user data. At block 608, the data contributors' decrypted user data is aggregated. As noted throughout, in various embodiments, the user data may be anonymized by each of the data contributors.

Figure 7A:
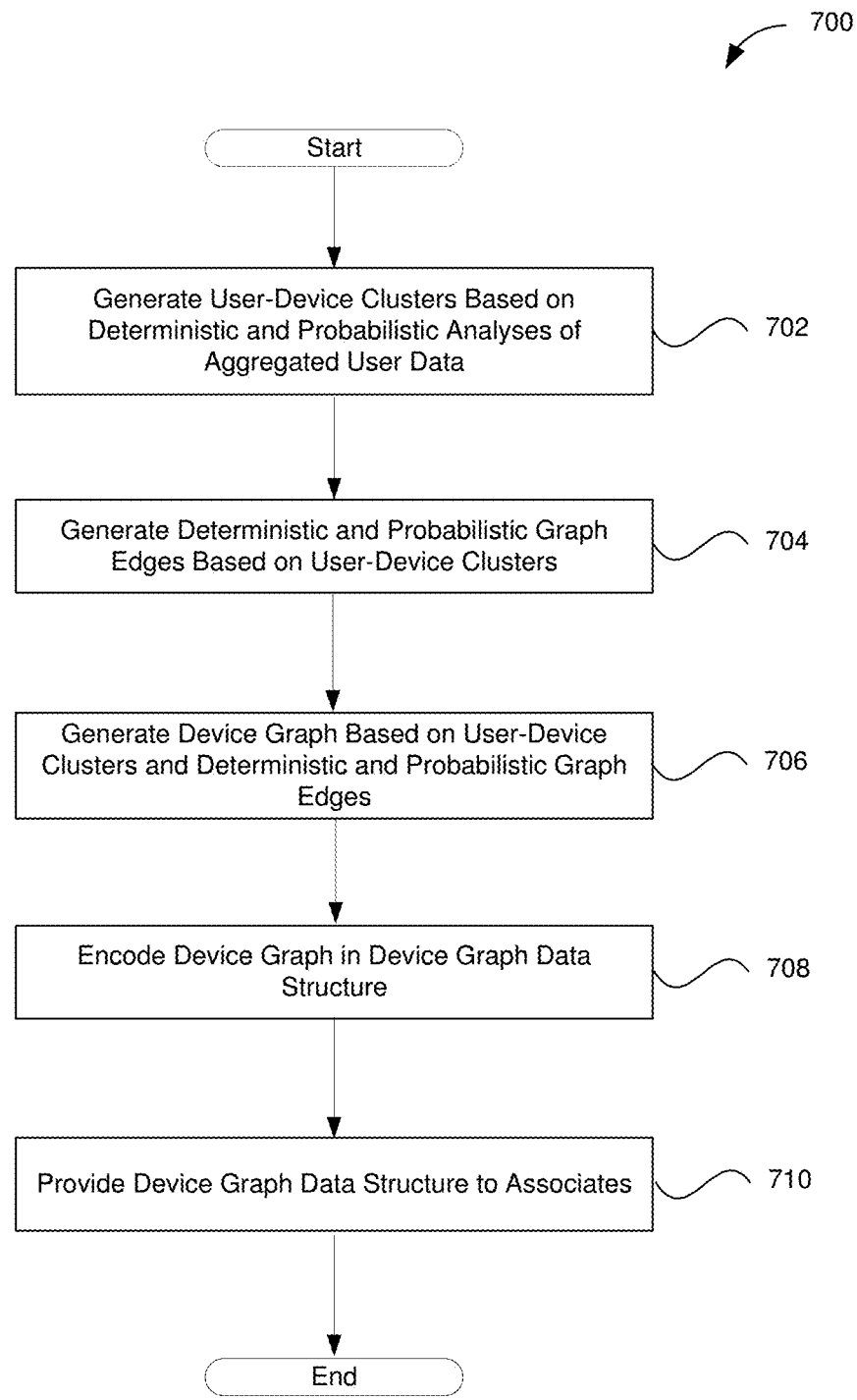
FIG. 7A illustrates one embodiment of a process flow for providing a device graph to data contributors of a device cooperative that is consistent with the various embodiments presented herein.

FIG. 7A illustrates one embodiment of a process flow for providing a device graph to data contributors of a device cooperative that is consistent with the various embodiments presented herein. A device graph generator, such as but not limited to device graph generator 326 of FIG. 3, may be enabled to perform at least portions of 700. Process 700 begins, after a start block, at block 702, where user-device clusters are generated based on deterministic and probabilistic analyses of the data contributors' decrypted aggregated user data. At block 704, deterministic and probabilistic graph edges are generated based on the user-device clusters. At block 706, a device graph is generated. The device graph may be based on the user-device clusters, as well as the deterministic and probabilistic graph edges. Various embodiments of user-device clusters, deterministic/probabilistic graph edges, and device graphs are discussed in conjunction with FIG. 2. At block 708, the device graph is encoded in a device graph data structure, such as but not limited to device graph data structure 440 of FIG. 4B. At block 710, the device graph data structure is provided to the data contributors. For instance, a communication network, such as communication network 120 of FIG. 1, may be employed to provide the device graph data structure to the data contributors.

Figure 7B:
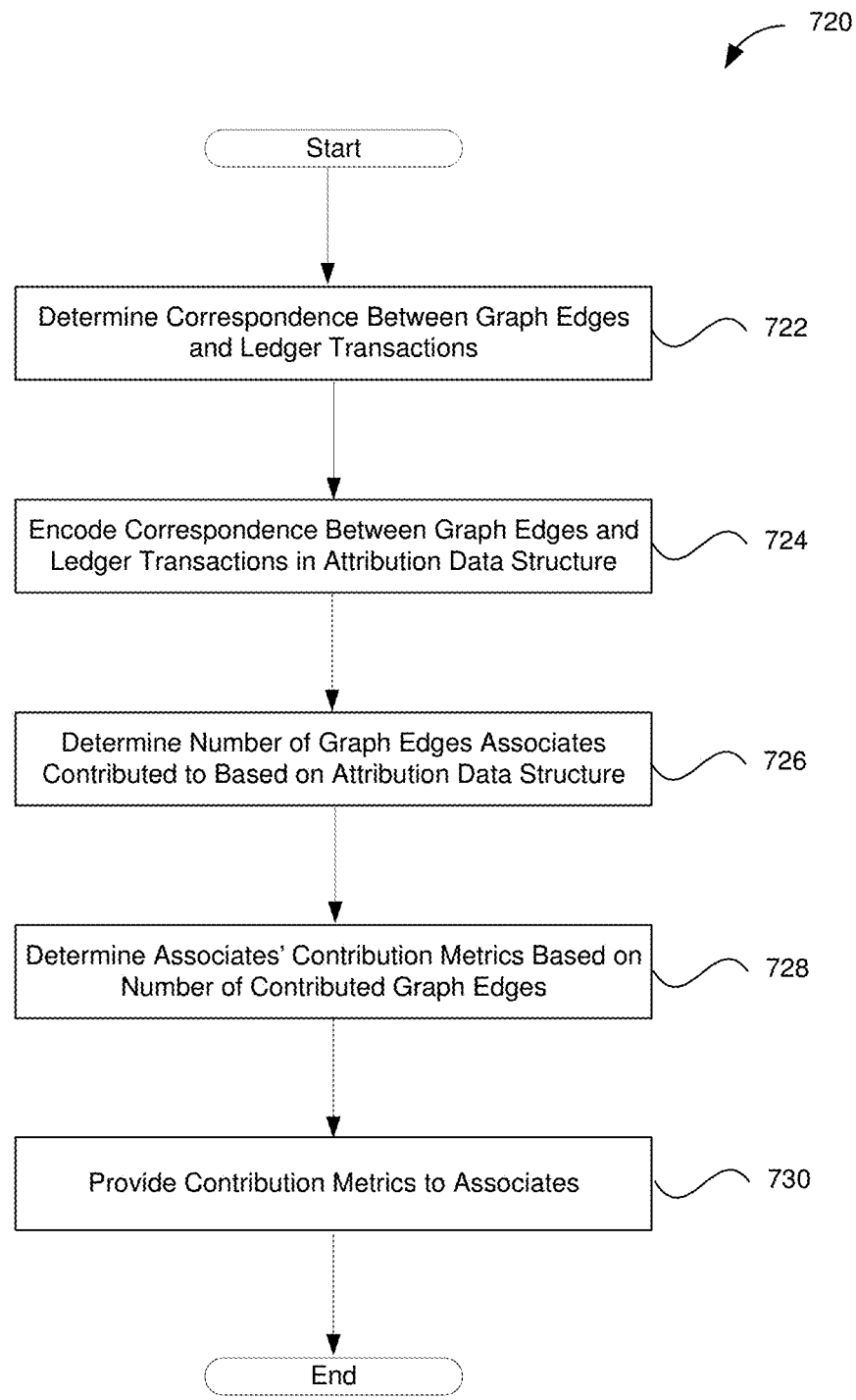
FIG. 7B illustrates one embodiment of a process flow for providing contribution metrics to data contributors of a device cooperative that is consistent with the various embodiments presented herein.

FIG. 7B illustrates one embodiment of a process flow for providing contribution metrics to data contributors of a device cooperative that is consistent with the various embodiments presented herein. Process 720 begins, after a start block, at block 722, where a correspondence between the graph edges and ledger transactions are determined. At block 724, the correspondence between the graph edges and the ledger transactions is encoded in an attribution data structures. Various embodiments of encoding a correspondence between graph edges and ledger transactions are discussed in conjunction with attribution data structure 430 of FIG. 4B. A transaction reference generator, such as but not limited to transaction reference generator 324 of FIG. 3, may be enabled to perform at least portions of blocks 722 and 724. At block 726, the number of graph edges that each data contributor contributed to via their user data is determined based on the correspondence between graph edges and the ledger transactions. At block 728, a contribution metric for each data contributor is determine based on the number of graph edges that the data contributor contributed to. An attribution component, such as but not limited to attribution component 322 of FIG. 3, may be enabled to perform at least portions of blocks 726 and 728. At block 730, the contribution metrics are provided to the data contributors. Communication network 120 may be employed to provide the contribution metrics to the data contributors.

FIG. 7C illustrates pseudocode implementing one embodiment for determining a contribution metric for an data contributor of a device cooperative that is consistent with the various embodiments presented herein. To determine a contribution metric for data contributor X, consider the set (G) of all connected subgraphs of the device graph for data contributor X. g is a connected subgraph that belongs to the set G. The set of edges included in g is referred to as E. The individual elements (i.e., graph edges) of E are referenced as e. Pt is the set of all the pointers present in G and contributed by all the data contributors. Px is the set of all the pointers present in G that only data contributor X has contributed.

The relative contribution metric for X may be calculated and/or determined by the function CalculateRelativeContribution, shown in FIG. 7C, where the CalculateRelativeContribution function takes Px and Pt as the arguments. Note that the CalculateRelativeContribution function calls other functions CalculateContributionFromData and getData, which are also illustrated in FIG. 7C. getData calls the function BlockChain[p], which returns the encrypted data of the blockchain-type ledger at position p. The Decrypt( ) function extracts the raw data by decrypting the encrypted data using the previously shared set of keys K.

The function definitions and corresponding source code for the CalculateRelativeContribution, getData, and Decrypt are provided to each data contributor of cooperative. However, only the trusted data aggregator can compute the relative contribution metric for data contributor X because only the data aggregator can successfully execute the function Decrypt(BlockChain [p], K). This is because only the data aggregator has access to all the decryption keys denoted by the set K.

Data contributor X may request a verification of the calculation of the relative contribution metric. Via an on-demand service, a zk-SNARK method, as described herein, may be provided to X. Because X has access to the source code illustrated in FIG. 7C, the aggregator may provide the requested verification. In various embodiments, the verification for the calculation of a contribution metric, such as those discussed in conjunction with at least FIG. 8A, includes the proof for only CalculateRelativeContribution. In other embodiments, the proof fir the calculations of each of CalculateRelativeContribution, getData, and Decrypt may be performed. In still another embodiment, the verification includes generating a proof for the encryption step and the device graph computation steps in addition to the proof for the CalculateRelativeContribution step. A verification may include generating a proof for any combination of the steps described in conjunction with FIG. 7C, or described elsewhere herein.

Figure 8A:
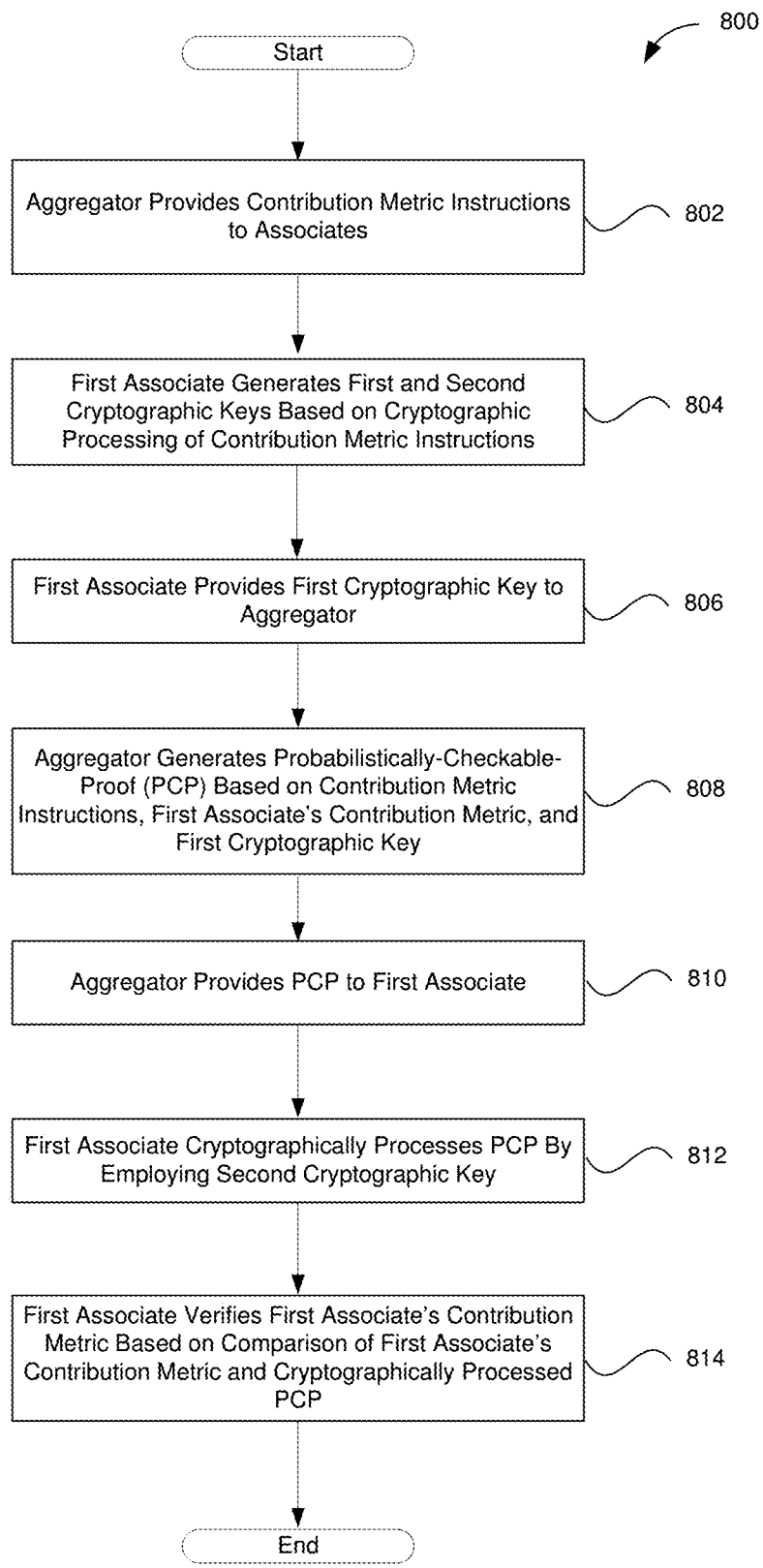
FIG. 8A illustrates one embodiment of a process flow for providing a verification of the contribution metrics to data contributors of a device cooperative that is consistent with the various embodiments presented herein.

FIG. 8A illustrates one embodiment of a process flow for providing a verification of the contribution metrics to data contributors of a device cooperative that is consistent with the various embodiments presented herein. Such a contribution metric may be determined, calculated, and/or generated via the embodiments discussed in conjunction with FIGS. 7B-7C. A verification component, such as but not limited to verification component 328 of FIG. 3, may be enabled to perform at least portions of 800. Process 800 begins, after a start block, at block 802, where the device cooperative's aggregator provides contribution metric instructions to the data contributors. Contribution metric instruction may include instruction regarding the method or process of determining a contribution metric. As such, contribution metric instruction may include source code that enables the calculation of a contribution metric. At block 804, a first data contributor of the data contributors generates a pair of cryptographic keys: a prover key and a verifier key. The pair of keys may be generated based on a cryptographic processing of the contribution metric instructions. For instance, the first data contributor may cryptographically compile the source code that enables calculation of the contribution metric. At block 806, the first data contributor may provide the prover key to the aggregator.

At block 808, the aggregator may generate a probabilistically-checkable-proof (PCP). The PCP may be based on the contribution metric for the first data contributor, the contribution metric instructions, and the first cryptographic key. At block 810, the aggregator may provide the PCP to the first data contributor. At block 814, the first data contributor may employ the verifier key to cryptographically process the PCP. At block 814, the first data contributor may verify the first data contributor's contribution metric based on a comparison of the first data contributor's contribution metric and the cryptographically processed PCP, which was processed via the verifier key.

Figure 8B:
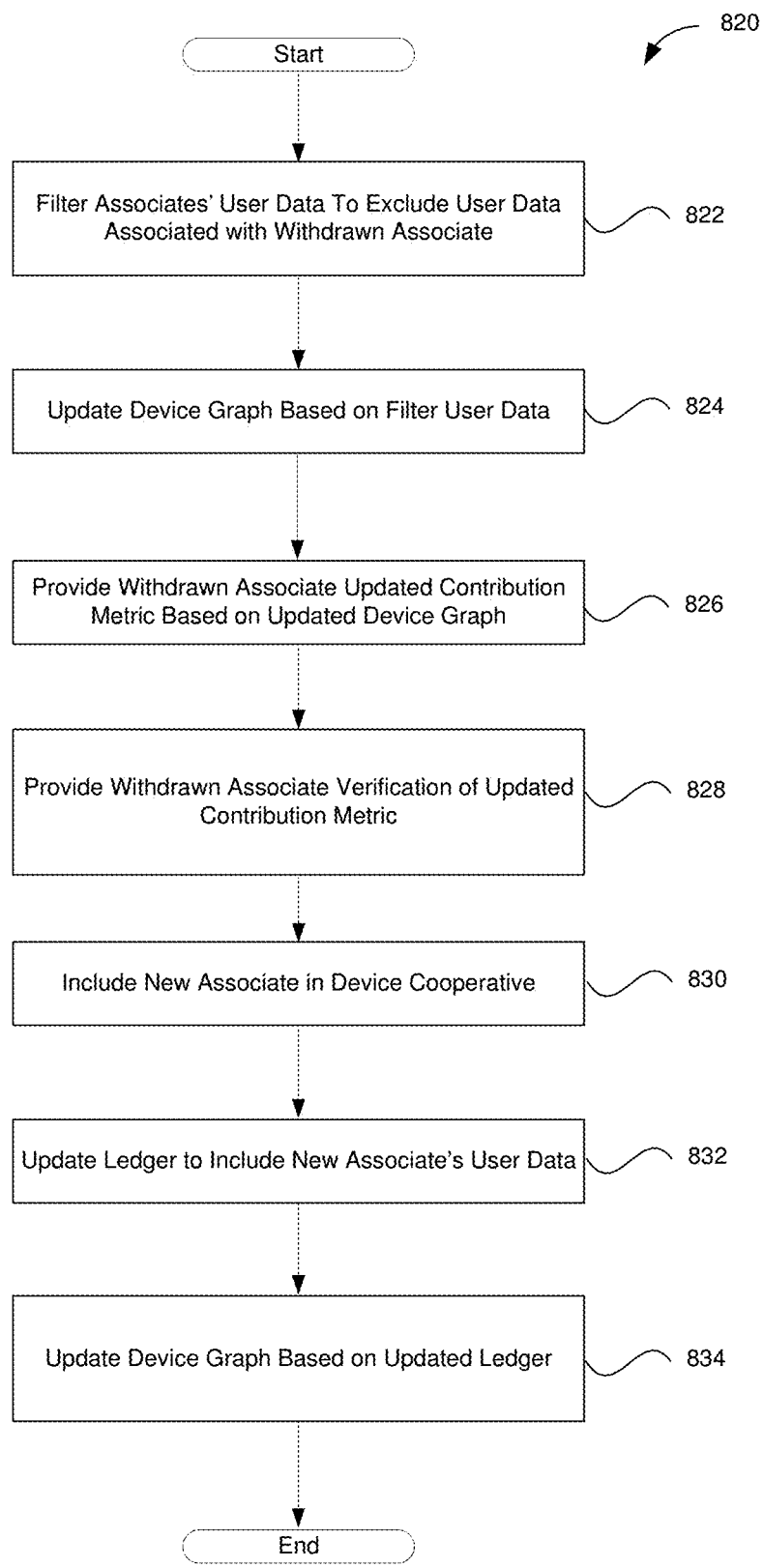
FIG. 8B illustrates one embodiment of a process flow for refreshing the inclusivity of a device cooperative that is consistent with the various embodiments presented herein.

FIG. 8B illustrates one embodiment of a process flow for refreshing an inclusivity device cooperative that is consistent with the various embodiments presented herein. A device cooperative engine, such as but not limited to device cooperative engine 142 of FIG. 1 and/or device cooperative engine 320 of FIG. 3, may be enabled to perform at least portions of 820. Process 820 begins, after a start block, at block 822, where the data contributors' user data is filtered to exclude user data associated with, or provided by, a data contributor that has withdrawn from the device cooperative. At block 822, the inclusivity of the device cooperative may be updated and/or refreshed to exclude the withdrawn data contributor. At block 824, the device graph is updated based on the filtered user data that excludes the user data provided by the withdrawn data contributor. At block 826, an updated contribution metric is provided to the withdrawn data contributor. The updated contribution metric indicates that the withdrawn data contributor's excluded user data does not contribute to the updated device graph. At block 828, the withdrawn data contributor is provided with a verification of the updated contribution metric. That is, the withdrawn data contributor is provided a zero knowledge proof that the data contributor's excluded user data does not contribute to the updated device graph.

At block 830, the inclusivity of the device cooperative is updated and/or refreshed to include a new data contributor. At block 832, the ledger is updated in include user data provided by the new data contributor. That is, additional ledger transactions are included in the ledger that encode the new data contributor's user data. The additional transactions may be blockchained transactions. At block 834, the device graph is updated based on the updated ledger. For instance, the device graph may be updated based on the new user data provided by the new data contributor.

Illustrative Computing Device

Figure 9:
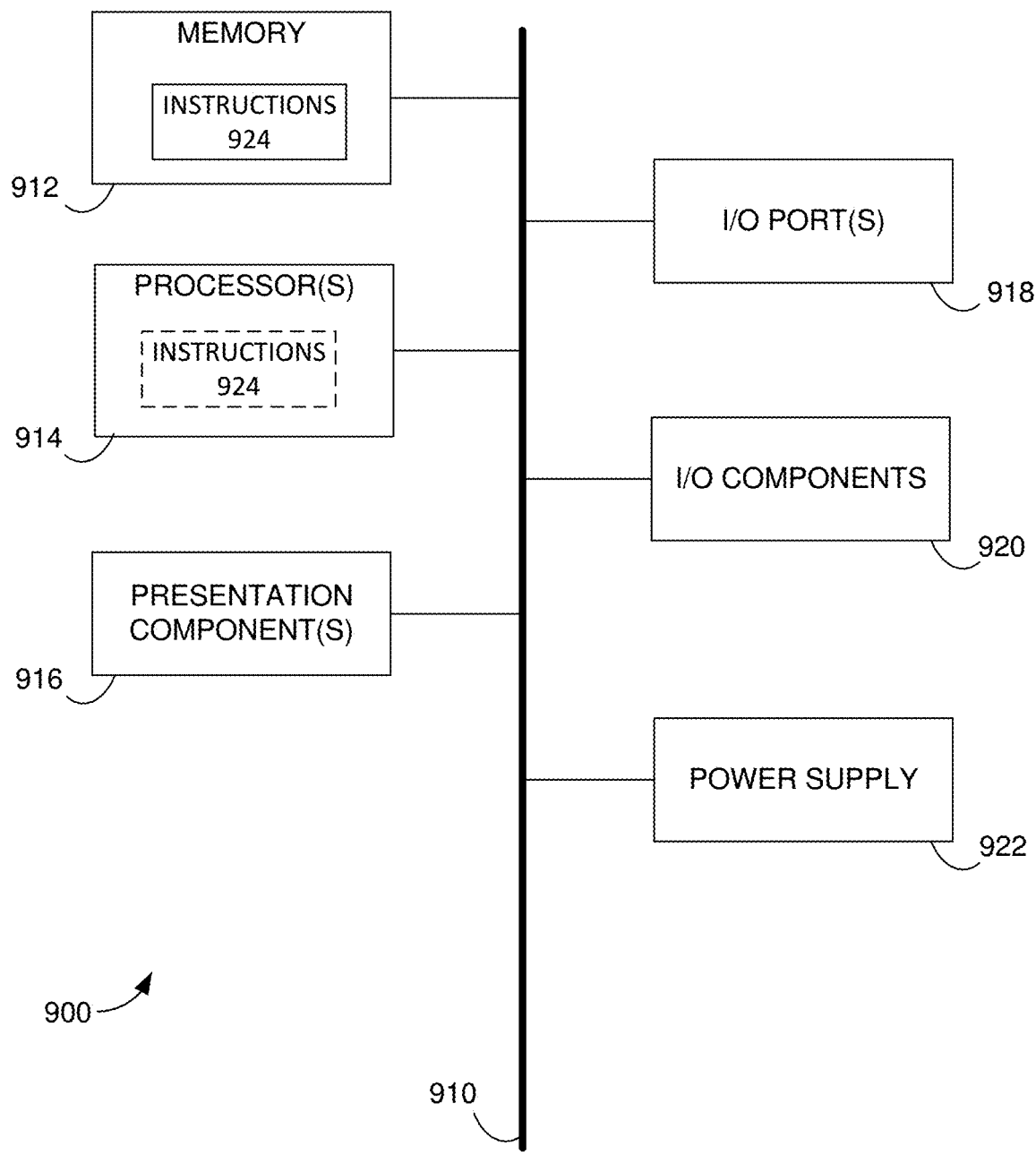
FIG. 9 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects herein-above set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A non-transitory computer-readable storage medium having instructions stored thereon for providing device graphing services to a plurality of website hosts that includes a first website host and other website hosts, the instructions when executed by a processor of a computing device cause the computing device to perform actions comprising:
   accessing user data that was provided by at least a portion of website hosts of the plurality of website hosts and is distributed across a plurality of ledger transactions that includes a first ledger transaction and a second ledger transaction, the second ledger transaction is subsequent to the first ledger transaction in a sequence of the plurality of ledger transactions, wherein a first portion of ledger transactions of the plurality of ledger transactions is associated with the first website host and the second ledger transaction includes a hash value of at least a portion of content of the first ledger transaction;
   generating a device graph based on the accessed user data, wherein the device graph includes a set of user nodes, a set of device nodes, and a set of graph edges that connects each user node of the set of user nodes to a corresponding subset of device nodes of the set of device nodes, wherein the generation of the device graph comprising determining each graph edge of the set of graph edges based on one or more ledger transactions of the plurality of ledger transactions;
   generating a first contribution metric for the first website host that indicates a contribution of the first website host to the device graph relative to the other website hosts, wherein the generation of the first contribution metric is based on a number of graph edges in the set of graph edges of the device graph, and the number of graph edges are determined based on one or more ledger transactions of the first portion of ledger transactions that is associated with the first website host; and
   providing, to the first website host, the device graph and the first contribution metric.

2. The non-transitory computer-readable storage medium of claim 1, wherein the actions further comprise:
   in response to receiving a request for a verification of the first contribution metric, generating a zero knowledge proof of the first contribution metric; and
   providing the zero knowledge proof of the first contribution metric to the first website host, wherein the first website host is enabled to evaluate the zero knowledge proof independent of access to a second portion of user data that was provided by the other website hosts.

3. The non-transitory computer-readable storage medium of claim 2, wherein the zero knowledge proof of the first contribution metric is based on an implementation of a zero-knowledge succinct non-interactive argument of knowledge method.

4. The non-transitory computer-readable storage medium of claim 1, wherein the actions further comprise:
   receiving a cryptographic key from the first website host;
   identifying the first portion of ledger transactions that is associated with the first website host, wherein the first portion of ledger transactions includes a first portion of user data that is encrypted and was provided by the first website host;
   employing the cryptographic key to decrypt the first portion of user data to obtain a decrypted first portion of user data; and
   aggregating the decrypted first portion of user data with another decrypted portion of user data.

5. The non-transitory computer-readable storage medium of claim 1, wherein each of the plurality of website hosts is an operator of a separate online platform, and the user data provided by at least the portion of website hosts of the plurality of website hosts indicates user activity and device activity on at least a portion of separate online platforms.

6. The non-transitory computer-readable storage medium of claim 1, wherein the set of user nodes includes a first user node and a second user node, the set of device nodes includes a first device node and a second device node, and the set of graph edges includes a first graph edge that deterministically connects the first user node to the first device node and a second graph edge that probabilistically connects the second user node to the second device node.

* * * * *